US011005599B2

(12) United States Patent
Hong et al.

(10) Patent No.: US 11,005,599 B2
(45) Date of Patent: May 11, 2021

(54) DATA TRANSMISSION SYSTEMS AND DATA TRANSMISSION METHODS OF SUPPRESSING DATA ERROR OCCURRENCES DUE TO CROSSTALK

(71) Applicant: SK hynix Inc., Icheon-si (KR)

(72) Inventors: Do Sun Hong, Icheon-si (KR); Seung Gyu Jeong, Gwangmyeong-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/731,461

(22) Filed: Dec. 31, 2019

(65) Prior Publication Data

US 2020/0389252 A1   Dec. 10, 2020

(30) Foreign Application Priority Data

Jun. 5, 2019   (KR) .................. 10-2019-0066425

(51) Int. Cl.
*H04L 1/18* (2006.01)
*H04L 1/00* (2006.01)
*H04B 3/32* (2006.01)
*H04L 1/08* (2006.01)

(52) U.S. Cl.
CPC ............ *H04L 1/0061* (2013.01); *H04B 3/32* (2013.01); *H04L 1/0042* (2013.01); *H04L 1/08* (2013.01)

(58) Field of Classification Search
CPC ....... H04L 1/0061; H04L 1/08; H04L 1/0042; H04B 3/32
See application file for complete search history.

(56) References Cited

U.S. PATENT DOCUMENTS

| 5,007,055 | A | * | 4/1991 | Isono | H04L 1/1812 |
| | | | | | 714/748 |
| 9,356,736 | B2 | * | 5/2016 | Uchida | G07F 7/0806 |
| 2013/0073919 | A1 | * | 3/2013 | Sano | H04L 1/1803 |
| | | | | | 714/748 |
| 2017/0026149 | A1 | * | 1/2017 | Birrittella | H04L 1/0058 |
| 2017/0163375 | A1 | * | 6/2017 | Niesen | H04L 1/08 |
| 2019/0124183 | A1 | * | 4/2019 | Lee | H04L 45/24 |

FOREIGN PATENT DOCUMENTS

KR   101076230 B1   10/2011

* cited by examiner

*Primary Examiner* — Dac V Ha
(74) *Attorney, Agent, or Firm* — William Park & Associates Ltd.

(57) ABSTRACT

A data transmission system includes a data transmitter and a data receiver. The data transmitter outputs 'N'-bit transmission data (where 'N' denotes a natural number which is equal to or greater than two). The data receiver receives the 'N'-bit transmission data through 'N'-number of data transmission lines. The data receiver transmits a re-transmission request signal to the data transmitter when the 'N'-bit transmission data inputted to the data receiver are erroneous data. The data transmitter divides the 'N'-bit transmission data in response to the re-transmission request signal and operates in a first data re-transmission mode so that the divided transmission data are resent, together with first ground data, to the data receiver.

30 Claims, 19 Drawing Sheets

DATA TRANSMISSION SYSTEMS AND DATA TRANSMISSION METHODS OF SUPPRESSING DATA ERROR OCCURRENCES DUE TO CROSSTALK

CROSS-REFERENCE TO RELATED APPLICATIONS

The present application claims priority under 35 U.S.C 119(a) to Korean Application No. 10-2019-0066425, filed on Jun. 5, 2019, which is incorporated herein by references in its entirety.

BACKGROUND

1. Technical Field

Various embodiments of the present teachings generally relate to data transmission systems and data transmission methods, more particularly, to data transmission systems and data transmission methods of suppressing data error occurrences due to crosstalk.

2. Related Art

Electronic devices include many components, and most of the components may be electronic components corresponding to semiconductor devices. Data transmission between semiconductor devices in electronic devices may be achieved through data transmission systems. As the operation speed of the electronic devices becomes faster, the frequency of error occurrences may increase while data is transmitted through the data transmission systems. The errors in data transmission may occur due to various factors, such as crosstalk between data transmission lines. That is, data transmitted through one data transmission line may be affected by electromagnetic energy generated from an adjacent data transmission line, resulting in data errors.

SUMMARY

According to an embodiment, a data transmission system includes a data transmitter and a data receiver. The data transmitter is configured to output 'N'-bit transmission data (where 'N' denotes a natural number which is equal to or greater than two). The data receiver is configured to receive the 'N'-bit transmission data through 'N'-number of data transmission lines. The data receiver is configured to transmit a re-transmission request signal to the data transmitter when the 'N'-bit transmission data inputted to the data receiver are erroneous data, and the data transmitter is configured to divide the 'N'-bit transmission data in response to the re-transmission request signal and configured to operate in a first data re-transmission mode so that the divided transmission data are resent, together with first ground data, to the data receiver.

According to another embodiment, there is provided a data transmission method. The data transmission method includes transmitting in parallel 'N'-bit transmission data from a data transmitter to a data receiver through 'N'-number of data transmission lines (where 'N' denotes a natural number which is equal to or greater than two), transmitting a re-transmission request signal to the data transmitter from the data receiver when the 'N'-bit transmission data inputted to the data receiver are erroneous data, and dividing the 'N'-bit transmission data in the data transmitter in response to the re-transmission request signal to perform a first data re-transmission operation for resending the divided transmission data together with first ground data to the data receiver.

BRIEF DESCRIPTION OF THE DRAWINGS

Certain features of the present teachings are illustrated by various embodiments with reference to the attached drawings, in which.

DETAILED DESCRIPTION OF THE EMBODIMENTS

In the following description of embodiments, it will be understood that the terms "first" and "second" are intended to identify elements, but not used to define a particular number or sequence of elements. In addition, when an element is referred to as being located "on", "over", "above", "under" or "beneath" another element, it is intended to mean relative position relationship, but not used to limit certain cases that the element directly contacts the other element, or at least one intervening element is present therebetween. Accordingly, the terms such as "on", "over", "above", "under", "beneath", "below" and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements therebetween.

Figure 1:
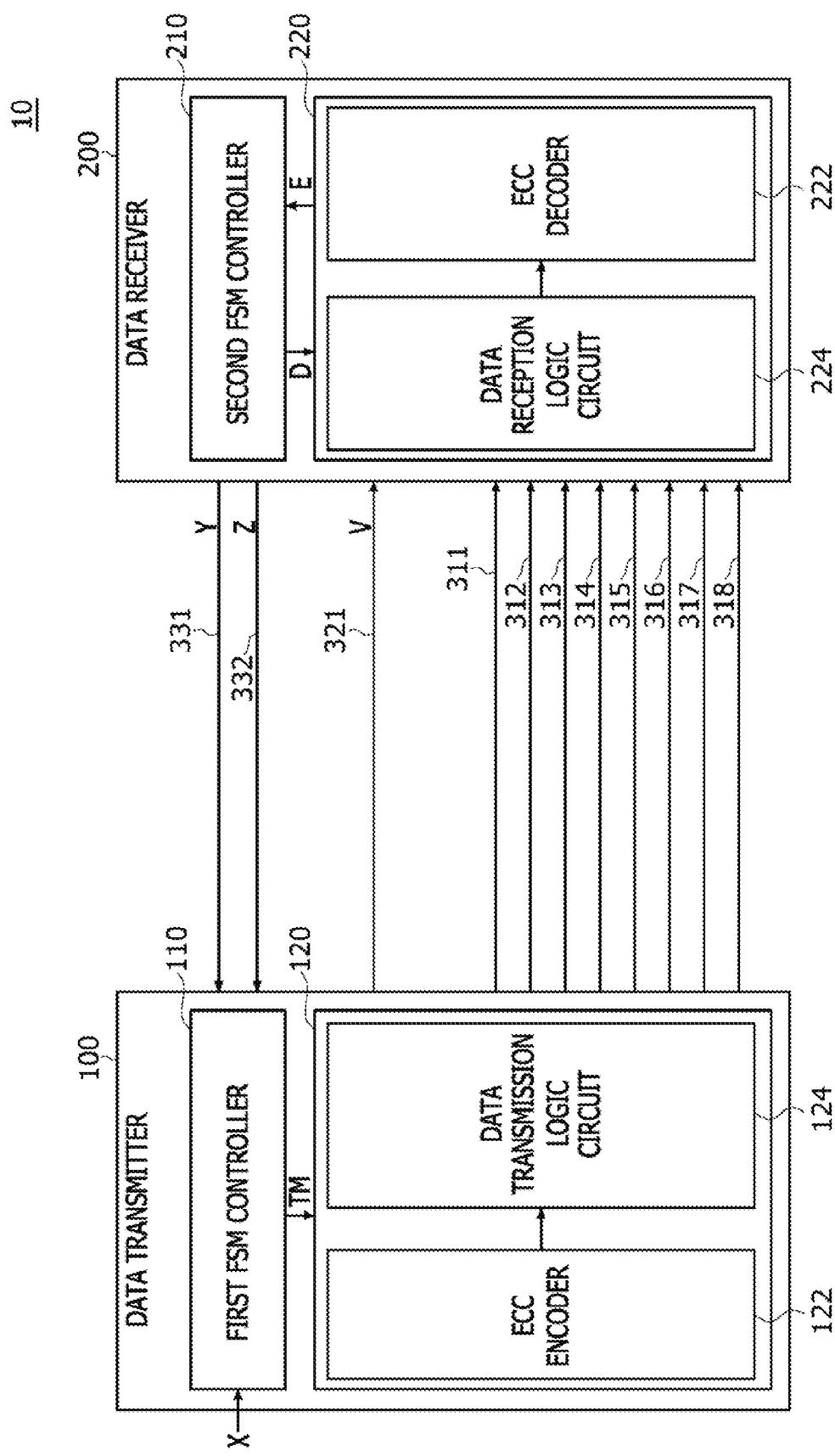
FIG. 1 is a block diagram illustrating a configuration of a data transmission system according to an embodiment of the present disclosure.

FIG. 1 is a block diagram illustrating a configuration of a data transmission system 10 according to an embodiment of the present disclosure. Referring to FIG. 1, the data transmission system 10 may be configured to include a data transmitter 100, a data receiver 200 and 'N'-number of transmission lines, for example, first to eighth transmission lines 311~318 (where, 'N' is a natural number). As used herein, the tilde "~" indicates a range of components. For example, "311~318" indicates the transmission lines 311, 312, 313, 314, 315, 316, 317, and 318 shown in FIG. 1. The data transmission system 10 may further include a valid signal transmission line 321, a reception end signal transmission line 331, and a re-transmission request signal transmission line 332. A data transmission operation for transmitting data from the data transmitter 100 to the data receiver 200 may be performed in a normal transmission mode firstly and may then be performed in a data transmission mode under a certain condition. The data transmission mode under the certain condition may include a first data re-transmission mode and a second data re-transmission mode. The normal transmission mode may be defined as an operation mode in which initial data are transmitted. The first data re-transmission mode may be defined as an operation mode in which transmission data are firstly re-sent when the transmission data transmitted in the normal transmission mode include erroneous data. The second data re-transmission mode may be defined as an operation mode in which the transmission data are secondly re-sent when the transmission data transmitted in the first data re-transmission mode include erroneous data. Although the present embodiment is described in conjunction with an example in which the data re-transmission mode includes only the first and second data re-transmission modes, the data re-transmission mode may include three or more data re-transmission modes according to different embodiments.

Bit values of the transmission data may be transmitted through respective first to eighth transmission lines 311~318, or bit values of divided transmission data of the transmission data and ground data may be transmitted through the first to eighth transmission lines 311~318. The ground data may be virtual data not included in the transmission data and may be comprised of binary bit values for suppressing crosstalk while the data are transmitted. Specifically, bit values of the transmission data may be transmitted through the respective first to eighth transmission lines 311~318 in the normal transmission mode. In the first data re-transmission mode, the transmission data may be divided into first divided transmission data and second divided transmission data. The first and second divided transmission data may be transmitted through some of the first to eighth transmission lines 311~318, and first ground data may also be transmitted through the remaining transmission lines of the first to eighth transmission lines 311~318 while the first and second divided transmission data are transmitted. In such a case, the first ground data may be transmitted through the transmission lines disposed between the transmission lines through which the first and second divided transmission data are transmitted. In the second data re-transmission mode, the transmission data may be divided into first to fourth additional divided transmission data. The first to fourth additional divided transmission data may be transmitted through some of the first to eighth transmission lines 311~318, and second ground data may also be transmitted through the remaining transmission lines of the first to eighth transmission lines 311~318 while the first to fourth additional divided transmission data are transmitted. In such a case, the second ground data may be transmitted through the transmission lines disposed between the transmission lines through which the first to fourth divided transmission data are transmitted.

The valid signal transmission line 321 may be a signal line through which a valid signal V informing the data receiver 200 of a transmission state of the transmission data being transmitted. In an embodiment, while no data are transmitted through the first to eighth transmission lines 311~318 from the data transmitter 100 to the data receiver 200, the valid signal V transmitted through the valid signal transmission line 321 from the data transmitter 100 to the data receiver 200 may have a first level, for example, a binary bit value of "0" corresponding to a logic "low" level. In contrast, while the transmission data are transmitted through the first to eighth transmission lines 311~318 from the data transmitter 100 to the data receiver 200, the valid signal V transmitted through the valid signal transmission line 321 from the data transmitter 100 to the data receiver 200 may have a second level, for example, a binary bit value of "1" corresponding to a logic "high" level. In the first data re-transmission mode, the valid signal V having a binary bit value of "1" may be transmitted through the valid signal transmission line 321 while the first and second divided transmission data and the first ground data are transmitted through the first to eighth transmission lines 311~318. In the second data re-transmission mode, the valid signal V having a binary bit value of "1" may be transmitted through the valid signal transmission line 321 while the first to fourth additional divided transmission data and the second ground data are transmitted through the first to eighth transmission lines 311~318.

The reception end signal transmission line 331 may be a signal line that is used to transmit a reception end signal Y from the data receiver 200 to the data transmitter 100. In an embodiment, when no error exists in the transmission data transmitted to the data receiver 200, the reception end signal Y having a certain level, for example, a binary bit value of "1" may be transmitted through the reception end signal transmission line 331 from the data receiver 200 to the data transmitter 100. When an error exists in the transmission data transmitted to the data receiver 200, the reception end signal Y having a binary bit value of "0" may be transmitted through the reception end signal transmission line 331 from the data receiver 200 to the data transmitter 100. If the reception end signal Y having a binary bit value of "1" is inputted to the data transmitter 100, the data transmitter 100 may regard the data transmission process as terminating. If the reception end signal Y having a binary bit value of "0" is inputted to the data transmitter 100, the data transmitter 100 may regard the data transmission process as not terminating.

The re-transmission request signal transmission line 332 may be a signal line that is used to transmit a re-transmission request signal Z from the data receiver 200 to the data transmitter 100. In an embodiment, when an error exists in the transmission data transmitted to the data receiver 200, the re-transmission request signal Z having a certain level, for example, a binary bit value of "1" may be transmitted through the re-transmission request signal transmission line 332 from the data receiver 200 to the data transmitter 100. When no error exists in the transmission data transmitted to the data receiver 200, the re-transmission request signal Z having a binary bit value of "0" may be transmitted through the re-transmission request signal transmission line 332 from the data receiver 200 to the data transmitter 100. If the re-transmission request signal Z having a binary bit value of "1" is inputted to the data transmitter 100, the data transmitter 100 may perform a data re-transmission operation in the first data re-transmission mode or the second data re-transmission mode.

The data transmitter 100 may be configured to include a first finite state machine controller (hereinafter, referred to as 'first FSM controller') 110 and a data transmission processor 120. The first FSM controller 110 may control a data transmission operation in the data transmitter 100. In order to control the data transmission operation in the data transmitter 100, the first FSM controller 110 may generate control signals for performing an operation of each of a plurality of states under a certain condition. In an embodiment, the plurality of states may include a first state corresponding to a data transmission standby state, a second state corresponding to a normal transmission mode state, a third state corresponding to a first data re-transmission mode state, and a fourth state corresponding to a second data re-transmission mode state. State transition in the data transmitter 100 may occur by a data transmission start signal, the reception end signal Y or the re-transmission request signal Z. If the state transition in the data transmitter 100 occurs, the first FSM controller 110 may output a data transmission mode control signal TM having a binary bit values to the data transmission processor 120. An operation of the first FSM controller 110 will be described in detail with reference to FIG. 2 later.

The data transmission processor 120 may perform the data transmission operation in a transmission mode corresponding to a control signal outputted from the first FSM controller 110. The data transmission processor 120 may include an error correction code (ECC) encoder 122 and a data transmission logic circuit 124. In an embodiment, the ECC encoder 122 may perform an ECC encoding operation of original data to generate parity data for detecting errors. The transmission data outputted from the data transmitter 100 may include the original data and the parity data. The transmission data generated by the ECC encoder 122 may be inputted to the data transmission logic circuit 124. The data transmission logic circuit 124 may transmit the transmission data in a transmission mode designated by the data transmission mode control signal TM outputted from the first FSM controller 110.

The data receiver 200 may be configured to include a second FSM controller 210 and a data reception processor 220. The second FSM controller 210 may control a data reception operation and a data re-transmission request operation in the data receiver 200. In order to control the data reception operation and the data re-transmission request operation in the data receiver 200, the second FSM controller 210 may perform an operation of each of the plurality of states under the certain condition. In an embodiment, the second FSM controller 210 may perform an operation of each of a first state corresponding to a data reception standby state, a second state corresponding to a data reception state, a third state corresponding to an ECC decoding state, a fourth state corresponding to a reception end state, and a fifth state corresponding to a re-transmission request state. State transition of the second FSM controller 210 may occur by the valid signal V and an error signal E. If the state transition of the second FSM controller 210 occurs, the second FSM controller 210 may generate and output an ECC decoding control signal D to the data reception processor 220 or may generate and output the reception end signal Y and the re-transmission request signal Z to the data transmitter 100. An operation of the second FSM controller 210 will be described in detail with reference to FIG. 3 later.

The data reception processor 220 may perform the data reception operation and an ECC decoding operation in response to a control signal outputted from the second FSM controller 210. The data reception processor 220 may include an ECC decoder 222 and a data reception logic circuit 224. The data reception logic circuit 224 may receive the transmission data from the data transmitter 100 and may output the transmission data to the ECC decoder 222. If the divided transmission data outputted from the data transmitter 100 are inputted to the data reception logic circuit 224, the data reception logic circuit 224 may perform an operation for merging the divided transmission data. In an embodiment, the ECC decoder 222 may perform the ECC decoding operation of the transmission data outputted from the data reception logic circuit 224 to discriminate whether the transmission data are erroneous data. Whether the transmission data are erroneous data may be discriminated using the parity data included in the transmission data. In an embodiment, if the transmission data are discriminated as erroneous data after the ECC decoding operation, the ECC decoder 222 may generate and output the error signal E having a certain level, for example, a binary bit value of "1" to the second FSM controller 210. In contrast, if the transmission data are discriminated as normal data without any error after the ECC decoding operation, the ECC decoder 222 may generate and output the error signal E having a binary bit value of "0" to the second FSM controller 210.

Figure 2:
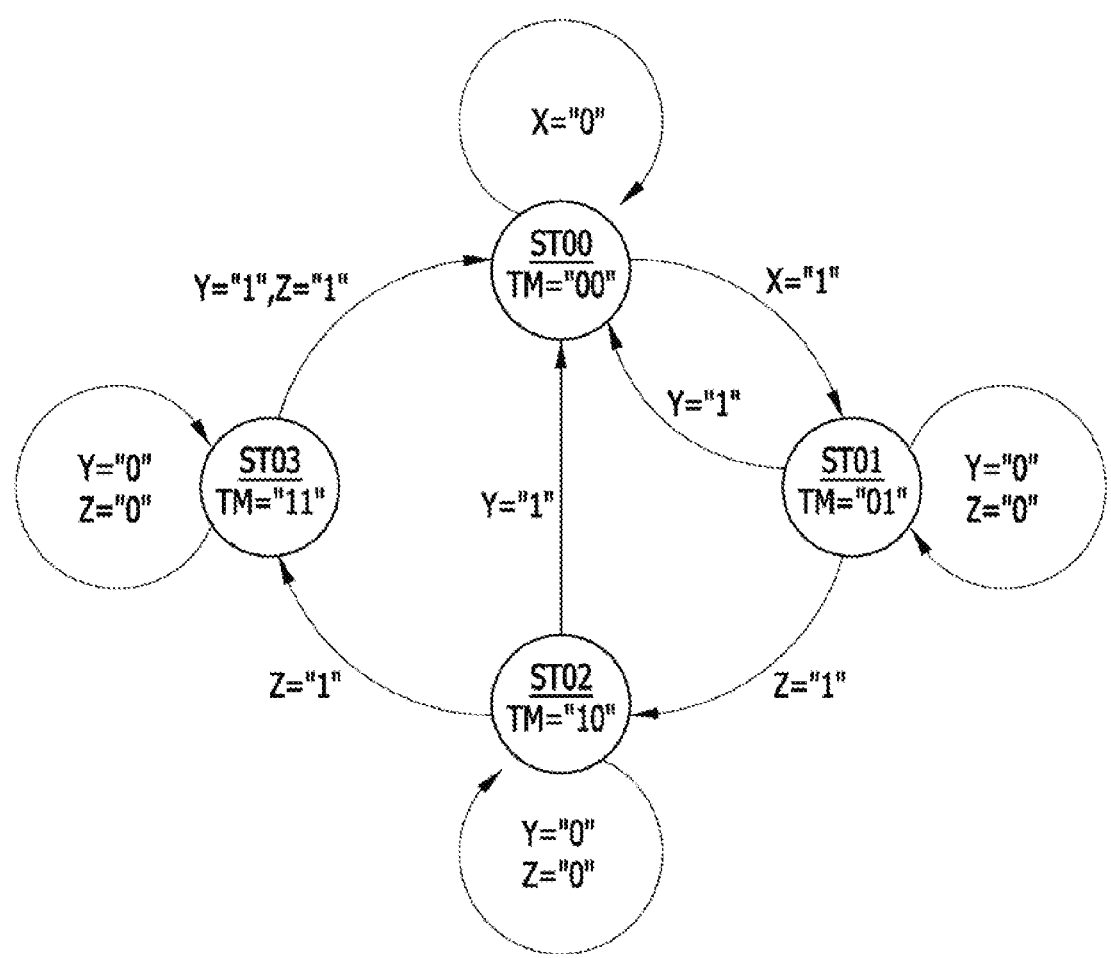
FIG. 2 is a state diagram illustrating an operation of a first FSM controller included in the data transmission system of FIG. 1.

FIG. 2 is a state diagram illustrating an operation of the first FSM controller 110 included in the data transmission system 10 of FIG. 1. Referring to FIGS. 1 and 2, the first FSM controller 110 may be configured to perform operations according to a first state ST00, a second state ST01, a third state ST02, and a fourth state ST03. The first state ST00 may be defined as an initialized state. That is, the first state ST00 may correspond to the data transmission standby state. In the first state ST00, the first FSM controller 110 may output the data transmission mode control signal TM having a logic level combination of "00" to the data transmission processor 120. In the present embodiment, the data transmission mode control signal TM having a logic level combination of "00" may be defined as a control signal for performing a data transmission standby operation. If the data transmission mode control signal TM having a logic level combination of "00" is inputted to the data transmission processor 120, the data transmission processor 120 may maintain the data transmission standby state. The state transition from the first state ST00 to the second state ST01 may occur according to a logic level of an input control signal X inputted to the first FSM controller 110. The input control signal X may be a signal that controls execution or non-execution of the data transmission operation. In an embodiment, while the input control signal X has a certain level, for example, a logic "low(0)" level, the first FSM controller 110 may maintain the first state ST00. If a logic level of the input control signal X is changed from a logic "low(0)" level to a logic "high(1)" level, the state of the first FSM controller 110 may be changed from the first state ST00 to the second state ST01.

The second state ST01 of the first FSM controller 110 may be defined as a normal data transmission state. In the second state ST01, the first FSM controller 110 may output the data transmission mode control signal TM having a logic level combination of "01" to the data transmission processor 120. In the present embodiment, the data transmission mode control signal TM having a logic level combination of "01" may be defined as a control signal for performing the data transmission operation. If the data transmission mode control signal TM having a logic level combination of "01" is inputted to the data transmission processor 120, the data transmission processor 120 may perform the ECC encoding operation to generate the transmission data including the parity data and may output the transmission data including the parity data to the data receiver 200. The second state ST01 may be continuously maintained while both of the reception end signal Y and the re-transmission request signal Z outputted from the data receiver 200 have a logic "low(0)" level. If a logic level of the reception end signal Y is changed to a logic "high(1)" level, the state of the first FSM controller 110 may be changed from the second state ST01 to the first state ST00. The reception end signal Y having a logic "high(1)" level means that the data are normally transmitted to the data receiver 200 without any error. Thus, in such a case, the first FSM controller 110 may return to the first state ST00 corresponding to the data transmission standby state. In contrast, if a logic level of the re-transmission request signal Z is changed to a logic "high(1)" level (i.e., an error occurs while the data are transmitted in the normal transmission mode), the state of the first FSM controller 110 may be changed from the second state ST01 to the third state ST02.

The third state ST02 of the first FSM controller 110 may be defined as a first data re-transmission state. In the third state ST02, the first FSM controller 110 may output the data transmission mode control signal TM having a logic level combination of "10" to the data transmission processor 120. In the present embodiment, the data transmission mode control signal TM having a logic level combination of "10" may be defined as a control signal for performing a first data re-transmission operation. If the data transmission mode control signal TM having a logic level combination of "10" is inputted to the data transmission processor 120, the data transmission processor 120 may divide the transmission data and may transmit the divided transmission data and the first ground data to the data receiver 200. The first ground data may be virtual data not included in the transmission data and may be comprised of binary bit values for suppressing crosstalk while the data are transmitted in the first data re-transmission mode. The third state ST02 may be continuously maintained while both of the reception end signal Y and the re-transmission request signal Z outputted from the data receiver 200 have a logic "low(0)" level. If a logic level of the reception end signal Y is changed to a logic "high(1)" level, the state of the first FSM controller 110 may be changed from the third state ST02 to the first state ST00. The reception end signal Y having a logic "high(1)" level means that no error exists in the transmission data which are re-transmitted. Thus, in such a case, the first FSM controller 110 may return to the first state ST00 corresponding to the data transmission standby state. In contrast, if a logic level of the re-transmission request signal Z is changed to a logic "high(1)" level (i.e., an error occurs while the data are re-transmitted), the state of the first FSM controller 110 may be changed from the third state ST02 to the fourth state ST03.

The fourth state ST03 of the first FSM controller 110 may be defined as a second data re-transmission state. In the fourth state ST03, the first FSM controller 110 may output the data transmission mode control signal TM having a logic level combination of "11" to the data transmission processor 120. In the present embodiment, the data transmission mode control signal TM having a logic level combination of "11" may be defined as a control signal for performing a second data re-transmission operation. If the data transmission mode control signal TM having a logic level combination of "11" is inputted to the data transmission processor 120, the data transmission processor 120 may additionally divide the transmission data and may transmit the additionally divided transmission data and the second ground data to the data receiver 200. The second ground data may be virtual data not included in the transmission data and may be comprised of binary bit values for suppressing crosstalk while the data are transmitted in the second data re-transmission mode. In an embodiment, the second ground data may be comprised of the binary bit values as the first ground data. In another embodiment, the second ground data may be comprised of the binary bit values which are different from the binary bit values of the first ground data.

The fourth state ST03 may be continuously maintained while both of the reception end signal Y and the re-transmission request signal Z outputted from the data receiver 200 have a logic "low(0)" level. If a logic level of the reception end signal Y is changed to a logic "high(1)" level (i.e., no error exists in the transmission data which are additionally re-transmitted), the state of the first FSM controller 110 may be changed from the fourth state ST03 to the first state ST00. Even if a logic level of the re-transmission request signal Z is changed to a logic "high(1)" level (i.e., an error occurs even while the data are additionally re-transmitted), the state of the first FSM controller 110 may also be changed from the fourth state ST03 to the first state ST00 because there is no further additional re-transmission process.

Figure 3:
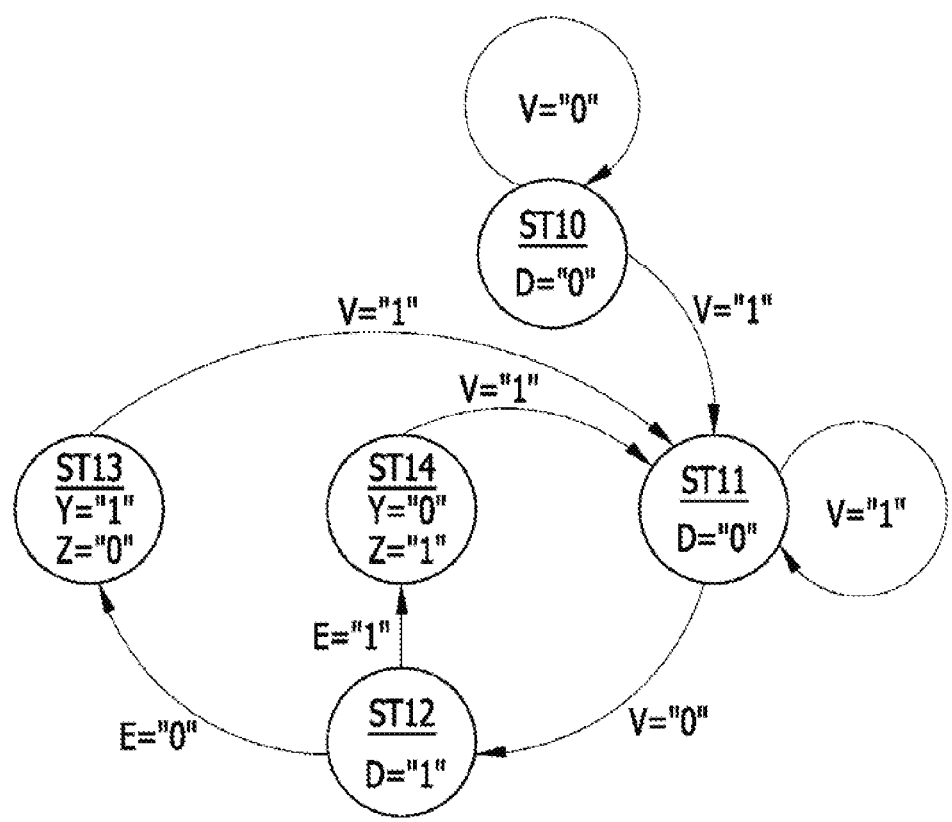
FIG. 3 is a state diagram illustrating an operation of a second FSM controller included in the data transmission system of FIG. 1.

FIG. 3 is a state diagram illustrating an operation of the second FSM controller 210 included in the data transmission system 10 of FIG. 1. Referring to FIGS. 1 and 3, the second FSM controller 210 may perform control operations according to a first state ST10, a second state ST11, a third state ST12, a fourth state ST13, and a fifth state ST14. The first state ST10 may be defined as an initialized state. That is, the first state ST10 may correspond to the data reception standby state. In the first state ST10, the second FSM controller 210 may output the ECC decoding control signal D having a logic "low(0)" level to the data reception processor 220. In the present embodiment, the ECC decoding control signal D having a logic "low(0)" level may be defined as a control signal for disabling the ECC decoding operation. The state transition from the first state ST10 to the second state ST11 may occur according to a logic level of the valid signal V transmitted from the data transmitter 100 to the second FSM controller 210. In an embodiment, while the valid signal V has a certain level, for example, a logic "low(0)" level, the second FSM controller 210 may maintain the first state ST10. If a logic level of the valid signal V is changed to a logic "high(1)" level, the state of the second FSM controller 210 may be changed from the first state ST10 to the second state ST11.

The second state ST11 of the second FSM controller 210 may be defined as a data reception state. In the second state ST11, the second FSM controller 210 may output the ECC decoding control signal D having a logic "low(0)" level to the data reception processor 220. While the valid signal V has a logic "high(1)' level, the second FSM controller 210 may maintain the second state ST11. During a time period that the valid signal V maintains a logic "high(1)' level, the data may be transmitted from the data transmitter 100 to the data receiver 200. Thus, the ECC decoding operation may not be performed in the data reception processor 220 while the valid signal V maintains a logic "high(1)' level. If a level of the valid signal V is changed to a logic "low(0)" level again (i.e., a data transmission process of the data transmitter 100 terminates), the state of the second FSM controller 210 may be changed from the second state ST11 to the third state ST12.

The third state ST12 of the second FSM controller 210 may be defined as an ECC decoding execution state. In the third state ST12, the second FSM controller 210 may output the ECC decoding control signal D having a logic "high(1)" level to the data reception processor 220. When the ECC decoding control signal D having a logic "high(1)" level is inputted to the data reception processor 220, the data reception processor 220 may perform the ECC decoding operation of the transmission data to discriminate whether the transmission data are erroneous data and may output the error signal E according to the result of the discrimination. In an embodiment, if no error exists in the transmission data, the data reception processor 220 may output the error signal E having a logic "low(0)" level. In contrast, when the transmission data are erroneous data, the data reception processor 220 may output the error signal E having a logic "high(1)" level. The error signal E outputted from the data reception processor 220 may be inputted to the second FSM controller 210. The state of the second FSM controller 210 may be changed to the fourth state ST13 or the fifth state ST14 according to a level of the error signal E.

The fourth state ST13 of the second FSM controller 210 may be defined as the reception end state, and the fifth state ST14 of the second FSM controller 210 may be defined as the re-transmission request state. If the error signal E having a logic "low(0)" level is inputted to the second FSM controller 210, the state of the second FSM controller 210 may be changed from the third state ST12 to the fourth state ST13. In the fourth state ST13, the second FSM controller 210 may output the reception end signal Y having a logic "high(1)" level and the re-transmission request signal Z having a logic "low(0)" level. In contrast, when the error signal E having a logic "high(1)" level is inputted to the second FSM controller 210, the state of the second FSM controller 210 may be changed from the third state ST12 to the fifth state ST14. In the fifth state ST14, the second FSM controller 210 may output the reception end signal Y having a logic "low(0)" level and the re-transmission request signal Z having a logic "high(1)" level. If a level of the valid signal V is changed to a logic "high(1)" level again in the fourth state ST13 or the fifth state ST14, the state of the second FSM controller 210 may be changed from the fourth state ST13 or the fifth state ST14 to the second state ST11 corresponding to the data reception state.

Figure 4:
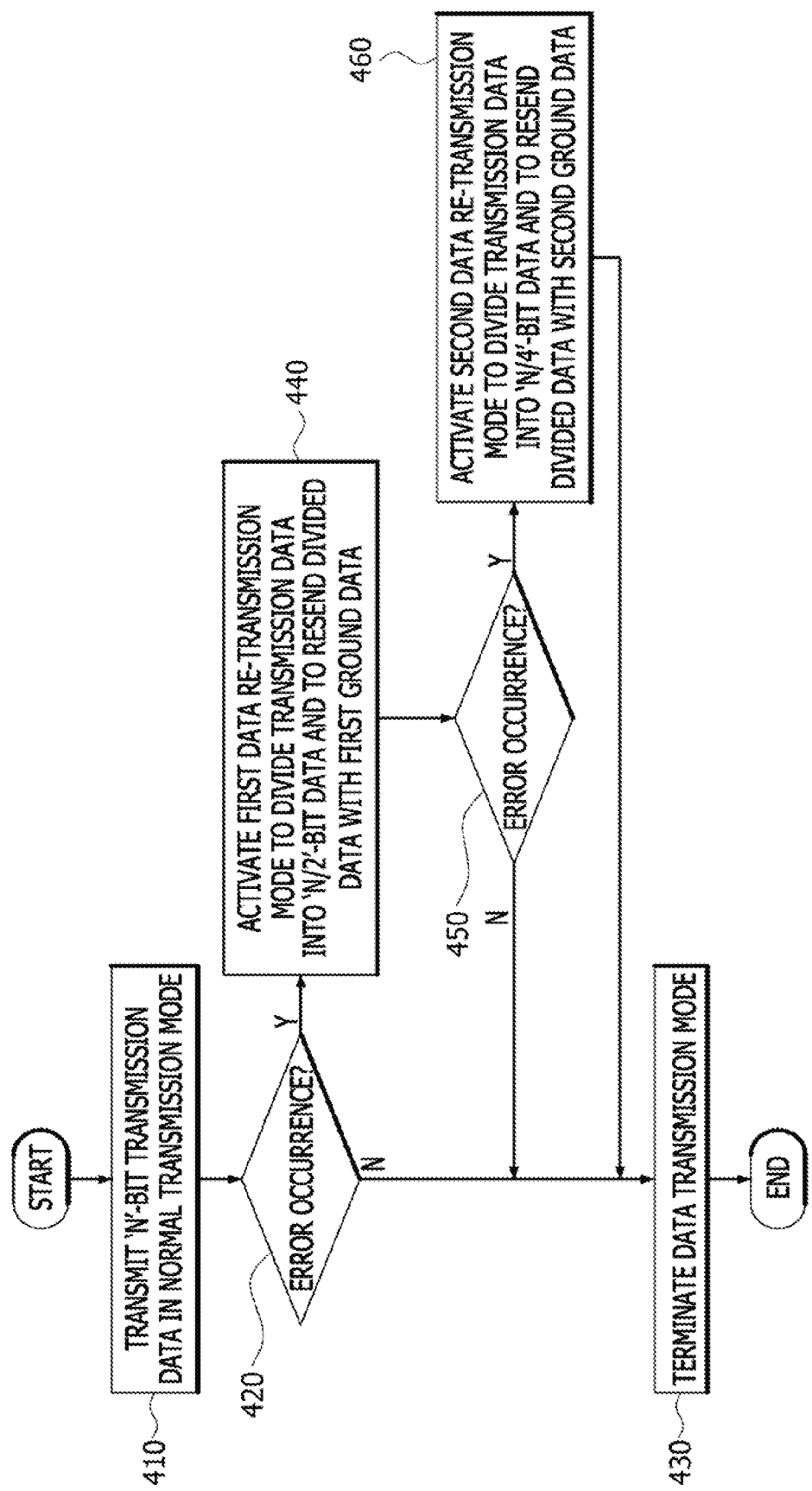
FIG. 4 is a flowchart illustrating a data transmission method according to an embodiment of the present disclosure.

FIG. 4 is a flowchart illustrating a data transmission method according to an embodiment of the present disclosure. Referring to FIG. 4, 'N'-bit transmission data may be transmitted through respective 'N'-number of transmission lines in the normal transmission mode (see a step 410). In an embodiment, the 'N'-bit transmission data may include parity data generated by the ECC encoding operation. In the normal transmission mode, bit values of the N'-bit transmission data may be transmitted through the 'N'-number of transmission lines, respectively. Whether the N'-bit transmission data are erroneous data may be discriminated (see a step 420). If no error occurs in the 'N'-bit transmission data at the step 420, a data transmission mode may terminate (see a step 430). If the 'N'-bit transmission data include an error at the step 420, the transmission data may be re-transmitted in the first data re-transmission mode (see a step 440). The first data re-transmission mode may be activated to divide the transmission mode into 'N/2'-bit data and to resend the divided transmission data with first ground data. In an embodiment, the first ground data may have binary bit values of a logic "low(0)" level. At the step 440, the 'N'-bit transmission data may be divided into first divided transmission data having 'N/2' bits and second divided transmission data having 'N/2' bits. The first divided transmission data having 'N/2' bits may be transmitted with the first ground data having 'N/2' bits during a first data transmission clock cycle. Subsequently, the second divided transmission data having 'N/2' bits may be transmitted with the first ground data having 'N/2' bits during a second data transmission clock cycle. The data transmission operation may be performed such that the first divided transmission data having 'N/2' bits and the second divided transmission data having 'N/2' bits are transmitted through even-numbered transmission lines (or odd-numbered transmission lines) among the 'N'-number of transmission lines and the first ground data having 'N/2' bits are transmitted through the odd-numbered transmission lines (or the even-numbered transmission lines) among the 'N'-number of transmission lines, thereby suppressing data error occurrence due to crosstalk between two adjacent transmission lines.

After the step 440, the first divided transmission data having 'N/2' bits and the second divided transmission data having 'N/2' bits may be merged to regenerate 'N'-bit transmission data and whether the regenerated 'N'-bit transmission data are erroneous data may be discriminated (see a step 450). If no error exists in the regenerated 'N'-bit transmission data at the step 450, the data transmission mode may terminate (see the step 430). However, when an error exists in the regenerated 'N'-bit transmission data at the step 450, the transmission data may be re-transmitted in the second data re-transmission mode (see a step 460). The second data re-transmission mode may be activated to additionally divide the transmission mode into 'N/4'-bit data and to resend the additionally divided transmission data with second ground data. In an embodiment, the second ground data may have binary bit values of a logic "low(0)" level. At the step 460, the 'N'-bit transmission data may be divided into first additionally divided transmission data having 'N/4' bits, second additionally divided transmission data having 'N/4' bits, third additionally divided transmission data having 'N/4' bits, and fourth additionally divided transmission data having 'N/4' bits. The first additionally divided transmission data having 'N/4' bits may be transmitted with the second ground data having '3N/4' bits during a first data transmission clock cycle. Subsequently, the second additionally divided transmission data having 'N/4' bits may be transmitted with the second ground data having '3N/4' bits during a second data transmission clock cycle. Next, the third additionally divided transmission data having 'N/4' bits may be transmitted with the second ground data having '3N/4' bits during a third data transmission clock cycle. Finally, the fourth additionally divided transmission data having 'N/4' bits may be transmitted with the second ground data having '3N/4' bits during a fourth data transmission clock cycle.

More specifically, while the first additionally divided transmission data having 'N/4' bits are transmitted during the first data transmission clock cycle, one of four adjacent transmission lines included in the 'N'-number of transmission lines may be used to transmit one-bit datum among the first additionally divided transmission data having 'N/4' bits and the remaining three transmission lines among the four adjacent transmission lines may be used to transmit the second ground data. In addition, while the second additionally divided transmission data having 'N/4' bits are transmitted during the second data transmission clock cycle, one of four adjacent transmission lines included in the 'N'- number of transmission lines may be used to transmit one-bit datum among the second additionally divided transmission data having 'N/4' bits and the remaining three transmission lines among the four adjacent transmission lines may be used to transmit the second ground data. Similarly, while the third additionally divided transmission data having 'N/4' bits are transmitted during the third data transmission clock cycle, one of four adjacent transmission lines included in the 'N'-number of transmission lines may be used to transmit one-bit datum among the third additionally divided transmission data having 'N/4' bits and the remaining three transmission lines among the four adjacent transmission lines may be used to transmit the second ground data. Moreover, while the fourth additionally divided transmission data having 'N/4' bits are transmitted during the fourth data transmission clock cycle, one of four adjacent transmission lines included in the 'N'-number of transmission lines may be used to transmit one-bit datum among the fourth additionally divided transmission data having 'N/4' bits and the remaining three transmission lines among the four adjacent transmission lines may be used to transmit the second ground data. As a result, the data transmission in the second data re-transmission mode may be more stably performed as compared with the data transmission in the first data re-transmission mode, thereby remarkably suppressing data error occurrence which is due to crosstalk between two adjacent transmission lines. After the data transmission in the second data re-transmission mode terminates at the step 460, the data transmission mode may terminate at the step 430.

Figure 5:
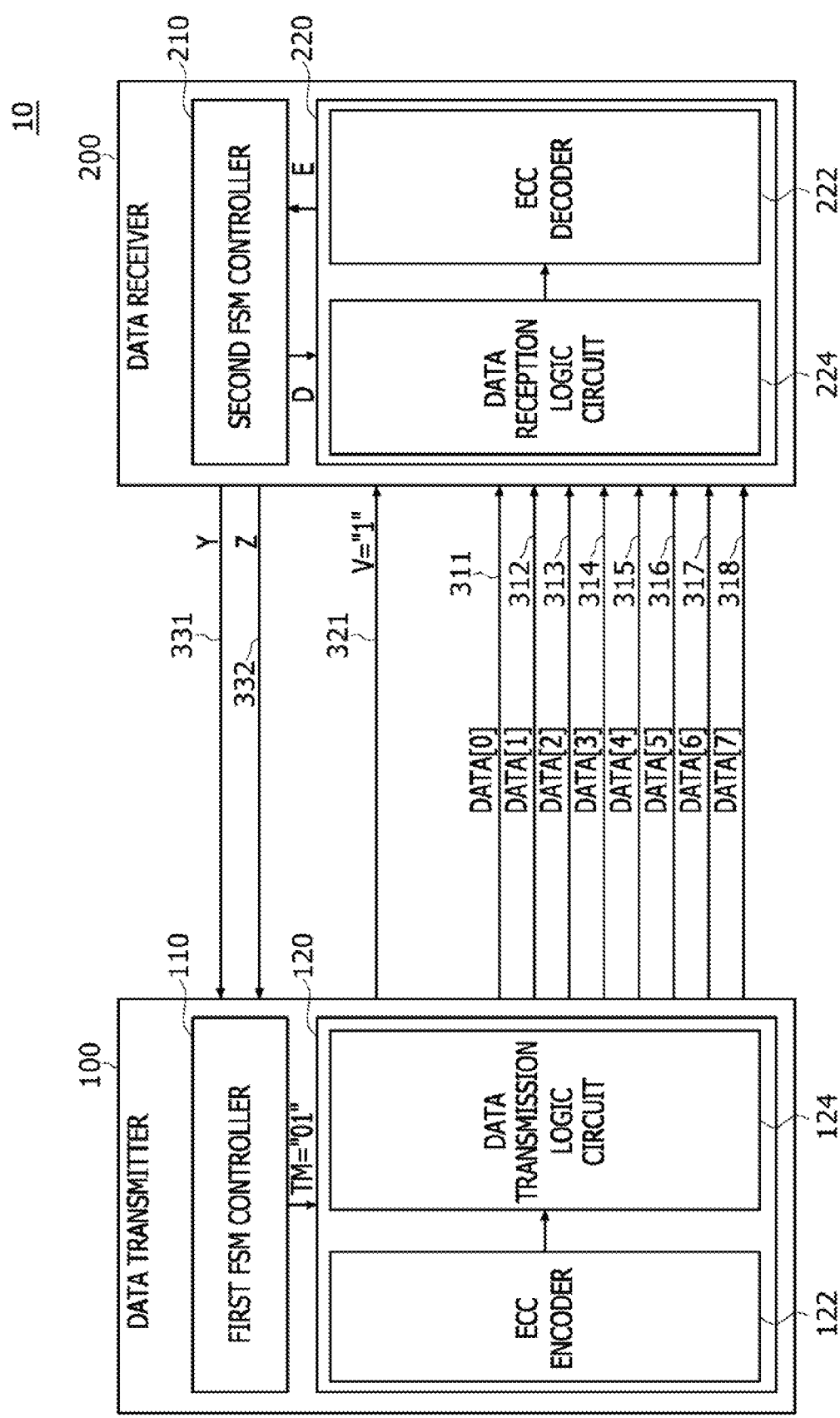
FIGS. 5 to 7 are block diagrams illustrating data transmission processes in a normal transmission mode of a data transmission system according to an embodiment of the present disclosure.
Figure 6:
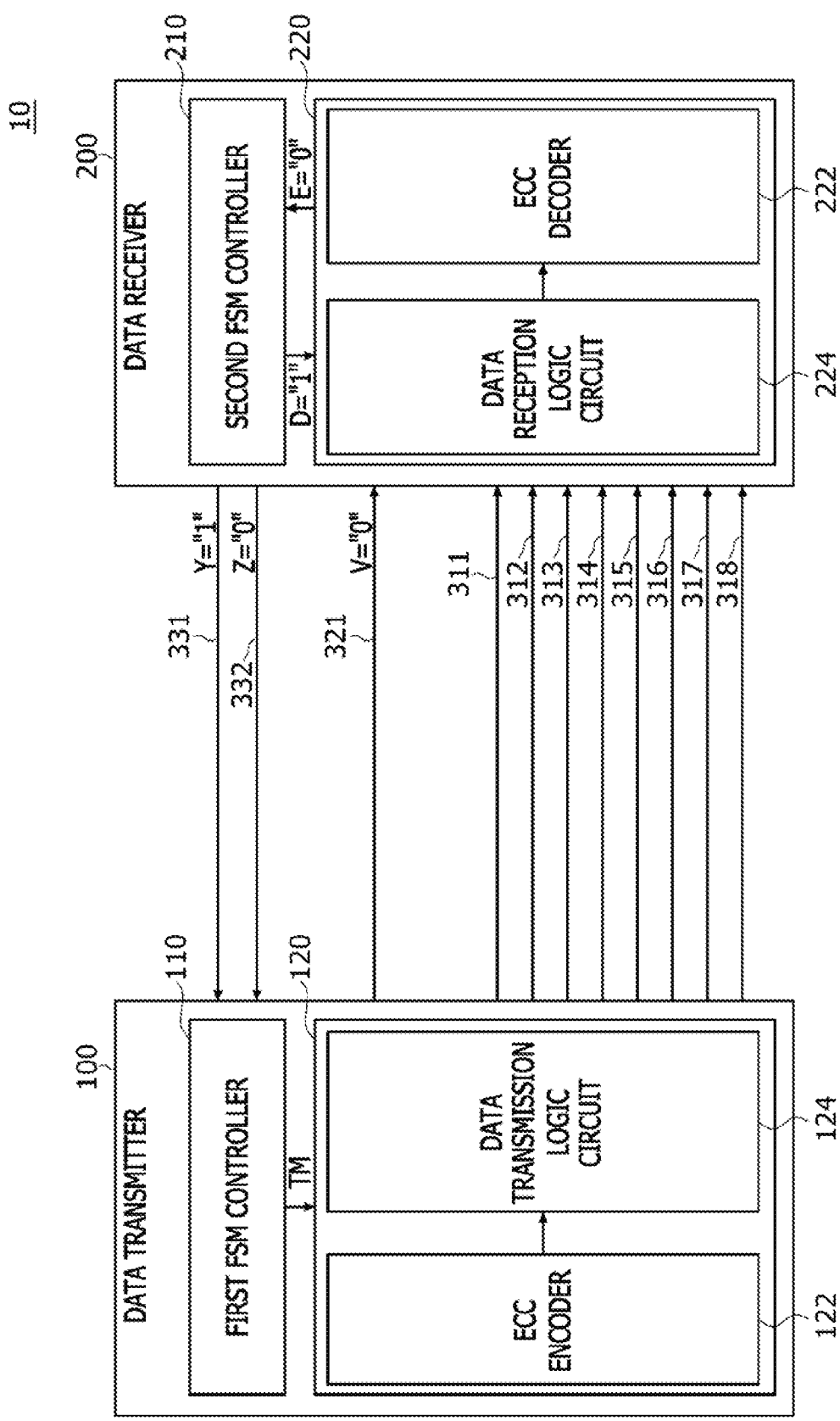
Figure 7:
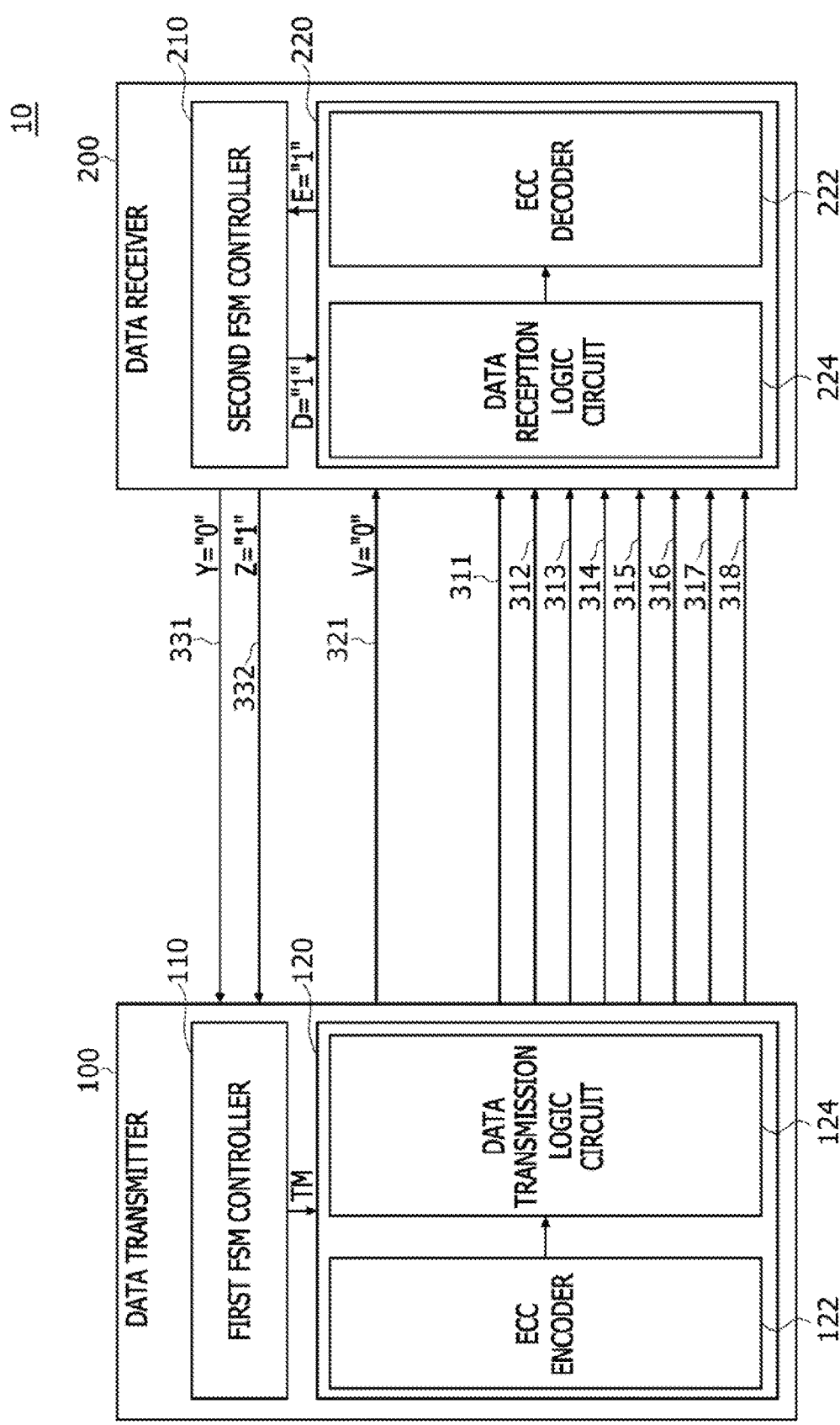
Figure 8:
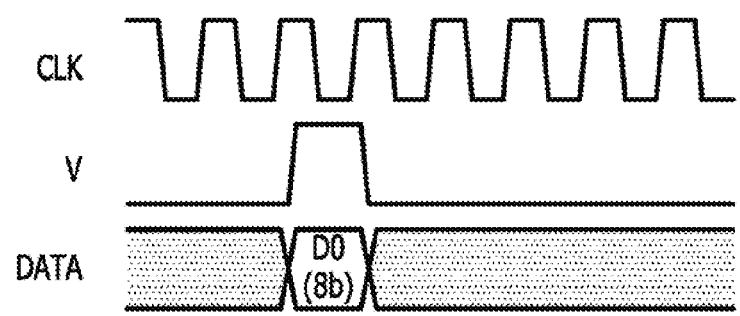
FIG. 8 is a timing diagram illustrating transmission of a valid signal and transmission data in a normal transmission mode of a data transmission system according to an embodiment of the present disclosure.
Figure 9:
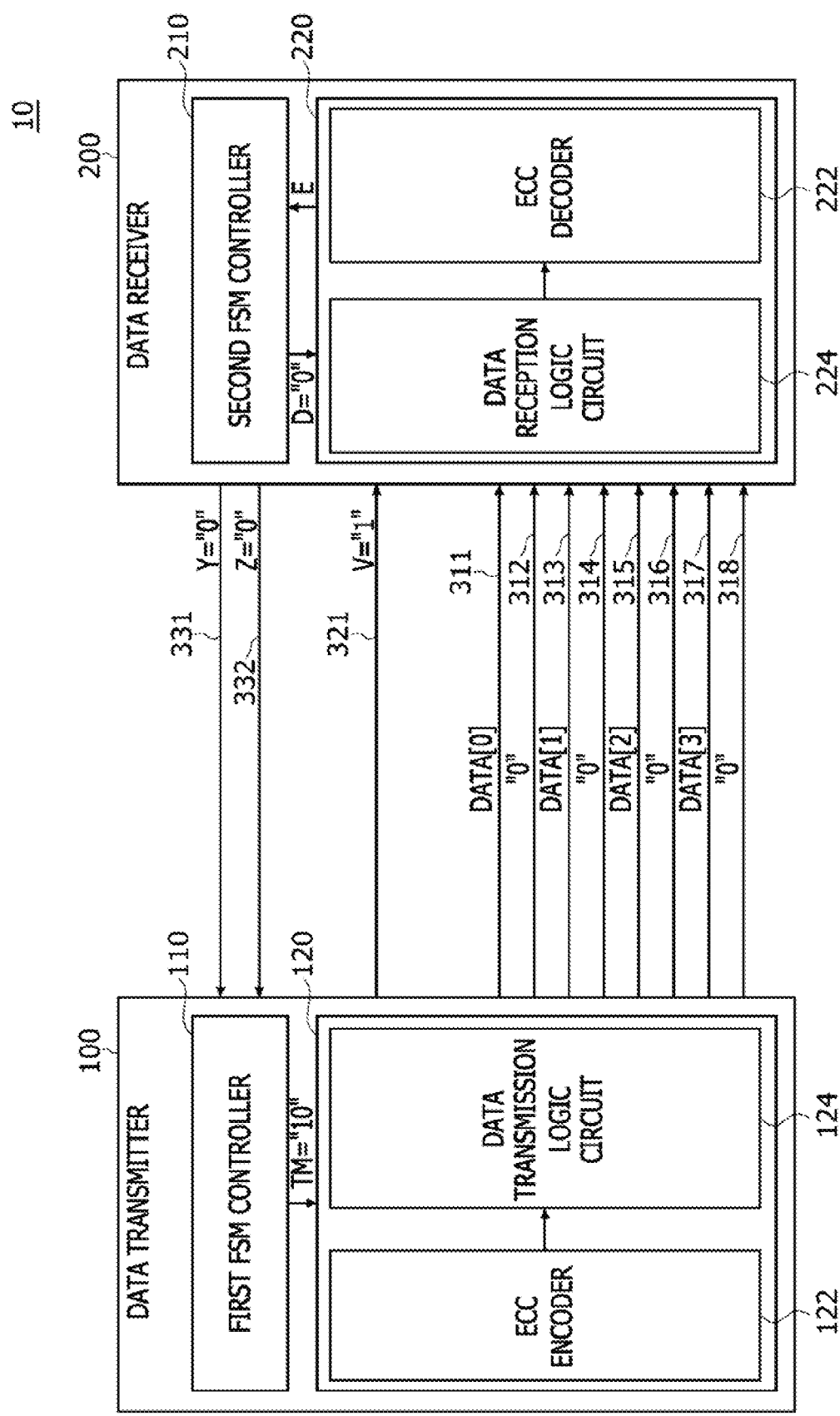
FIGS. 9 to 12 are block diagrams illustrating data transmission processes in a first data re-transmission mode of a data transmission system according to an embodiment of the present disclosure.

FIGS. 5 to 7 are block diagrams illustrating data transmission processes in the normal transmission mode of the data transmission system 10 shown in FIG. 1, and FIG. 8 is a timing diagram illustrating transmission of the valid signal V and data DATA in the normal transmission mode of the data transmission system 10 shown in FIG. 1. In FIGS. 5 to 7, the same reference numerals as used in FIG. 1 denote the same elements. First, referring to the FIG. 5, the first FSM controller 110 of the data transmitter 100 may output the data transmission mode control signal TM having a logic level combination of "01" corresponding to the normal transmission mode to the data transmission processor 120 in the data transmission mode. The ECC encoder 122 of the data transmission processor 120 may perform the ECC encoding operation of the original data to generate the transmission data including the parity data and may output the transmission data including the parity data to the data transmission logic circuit 124. The data transmission logic circuit 124 may transmit the transmission data outputted from the ECC encoder 122 to the data receiver 200 in the normal transmission mode according to a logic level combination "01" of the data transmission mode control signal TM.

Because the logic level combination "01" of the data transmission mode control signal TM means the normal transmission mode, the bit values of the 'N'-bit transmission data, for example, 8-bit transmission data DATA[0:7] may be transmitted through the respective first to eighth transmission lines 311~318. Accordingly, the first bit datum DATA[0] of the transmission data DATA[0:7] may be transmitted through the first data transmission line 311, the second bit datum DATA[1] of the transmission data DATA[0:7] may be transmitted through the second data transmission line 312, the third bit datum DATA[2] of the transmission data DATA[0:7] may be transmitted through the third data transmission line 313, the fourth bit datum DATA[3] of the transmission data DATA[0:7] may be transmitted through the fourth data transmission line 314, the fifth bit datum DATA[4] of the transmission data DATA[0:7] may be transmitted through the fifth data transmission line 315, the sixth bit datum DATA[5] of the transmission data DATA[0:7] may be transmitted through the sixth data transmission line 316, the seventh bit datum DATA[6] of the transmission data DATA[0:7] may be transmitted through the seventh data transmission line 317, and the eighth bit datum DATA[7] of the transmission data DATA[0:7] may be transmitted through the eighth data transmission line 318.

As illustrated in FIG. 8, an operation of transmitting 8-bit transmission data D0 in the normal transmission mode may be performed through all of the first to eighth transmission lines 311~318 during one cycle of a data transmission clock signal CLK. Thus, a wave form of a bit datum transmitted through a certain data transmission line among the first to eighth data transmission lines 311~318 may be distorted due to crosstalk with another bit datum transmitted through another data transmission line adjacent to the certain transmission line, and the distortion of the waveform of the bit datum may cause a data error. The transmission data D0 may be transmitted while the valid signal V maintains a logic "high(1)" level. That is, the valid signal V may have a logic "low(0)" level before the transmission data D0 are transmitted, and a level of the valid signal V may be changed from a logic "low(0)" level to a logic "high(1)" level at a point in time when the transmission of the transmission data D0 starts. The valid signal V may maintain a logic "high(1)" level while the transmission data D0 are transmitted. If the transmission of the transmission data D0 terminates, a level of the valid signal V may return to a logic "low(0)" level again. Thus, the data receiver 200 may be able to detect a start point in transmission of the transmission data D0 and an end point in transmission of the transmission data D0 from the level transition of the valid signal V.

Referring to FIGS. 6 and 7, if the transmission of the transmission data D0 terminates in the normal transmission mode and a level of the valid signal V is changed from a logic "high(1)" level to a logic "low(0)", the second FSM controller 210 of the data receiver 200 may output the ECC decoding control signal D having a logic "high(1)" level to the data reception processor 220. The ECC decoder 222 of the data reception processor 220 may receive the transmission data from the data reception logic circuit 224 and may perform the ECC decoding operation of the transmission data to discriminate whether the transmission data are erroneous data. If no error exists in the transmission data, the ECC decoder 222 may output the error signal E having a logic "low(0)" level to the second FSM controller 210, as illustrated in FIG. 6. When the error signal E having a logic "low(0)" level is inputted to the second FSM controller 210, the second FSM controller 210 may transmit the reception end signal Y having a logic "high(1)" level and the re-transmission request signal Z having a logic "low(0)" level to the data transmitter 100. In contrast, if an error exists in the transmission data, the ECC decoder 222 may output the error signal E having a logic "high(1)" level to the second FSM controller 210, as illustrated in FIG. 7. When the error signal E having a logic "high(1)" level is inputted to the second FSM controller 210, the second FSM controller 210 may transmit the reception end signal Y having a logic "low(0)" level and the re-transmission request signal Z having a logic "high(1)" level to the data transmitter 100.

Figure 11:
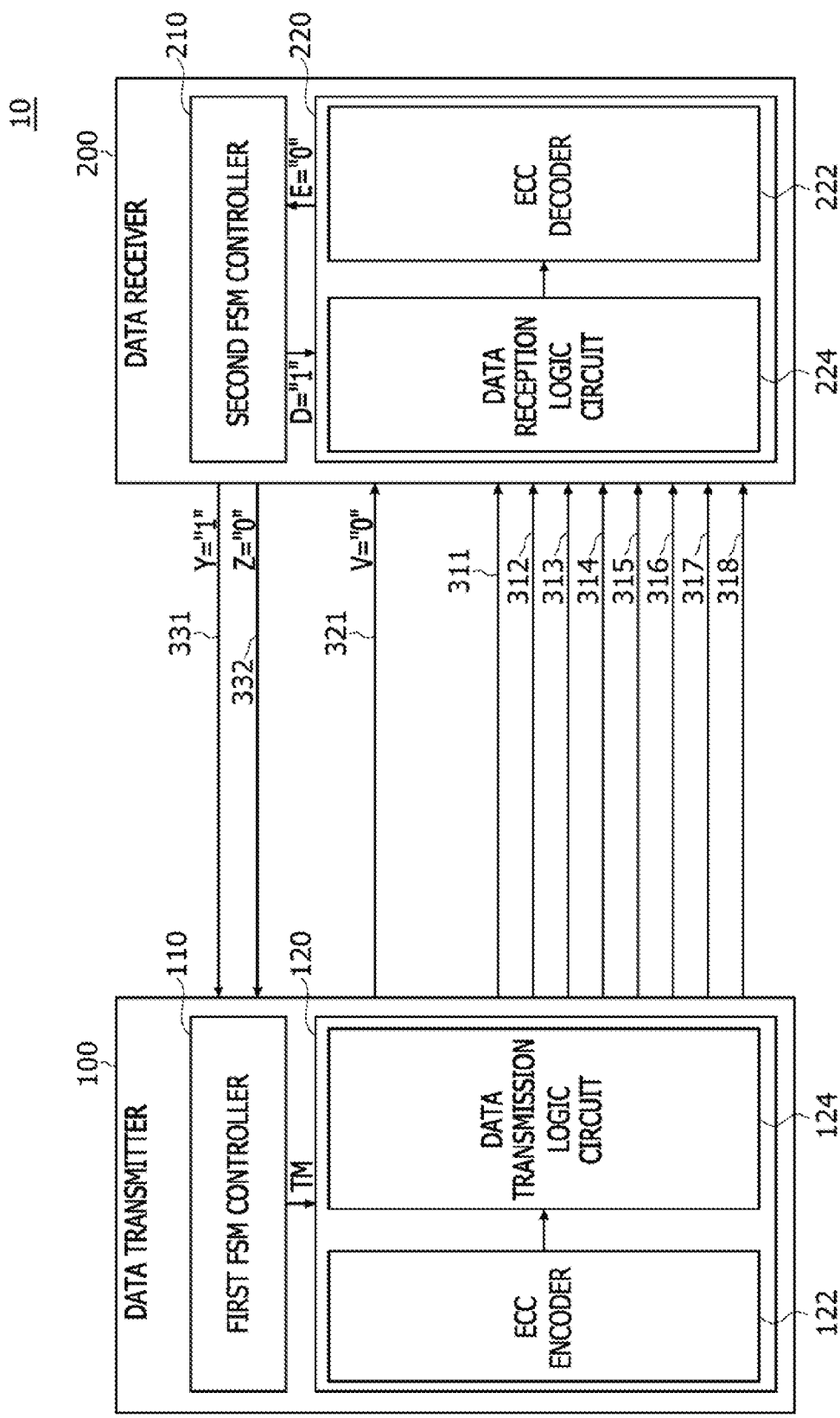
Figure 12:
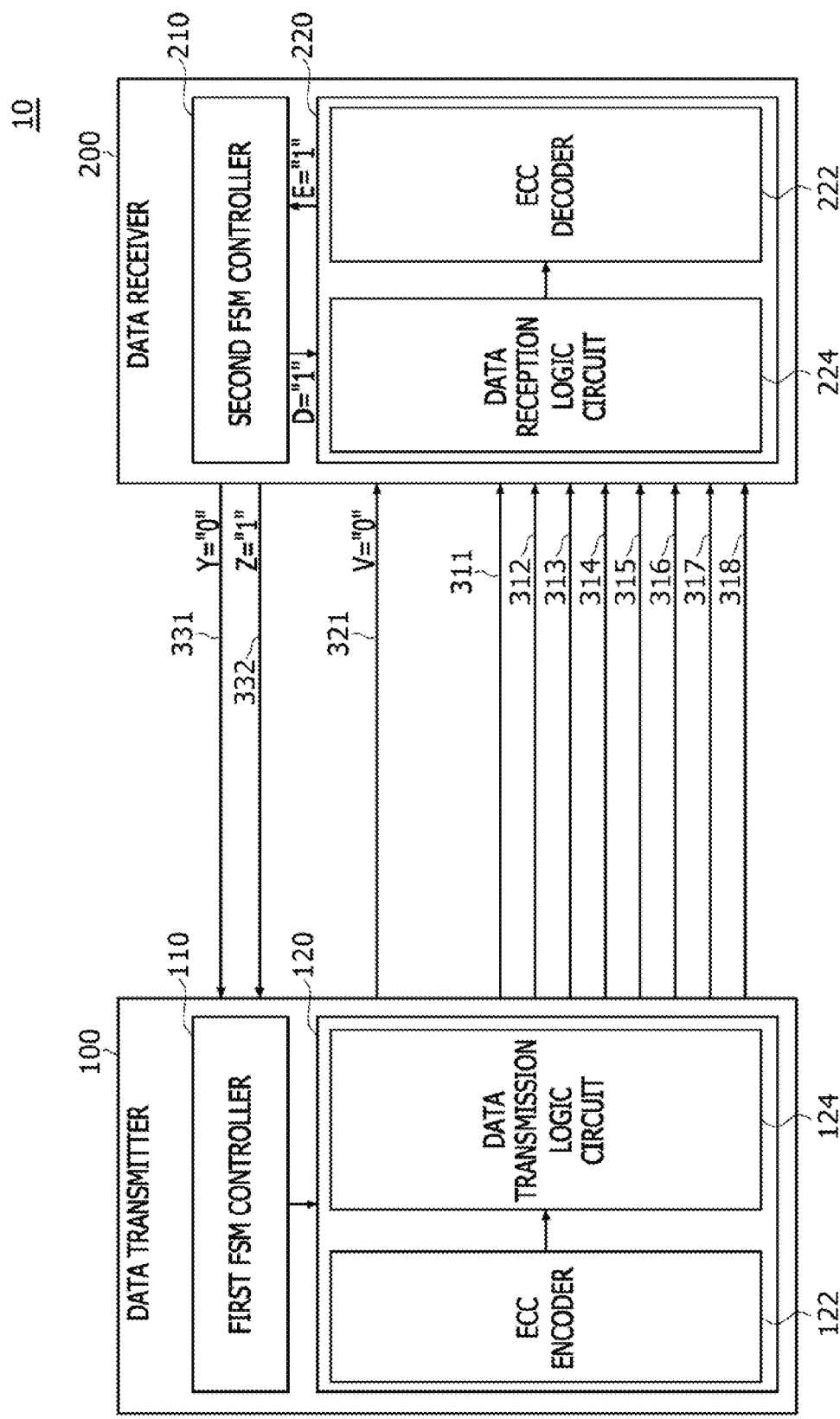
Figure 13:
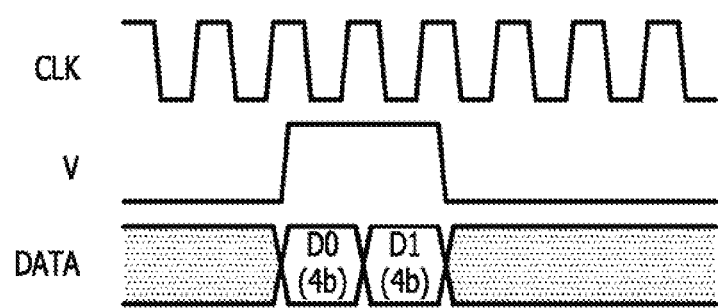
FIG. 13 is a timing diagram illustrating transmission of a valid signal and transmission data in a first data re-transmission mode of a data transmission system according to an embodiment of the present disclosure.

FIGS. 9 to 12 are block diagrams illustrating data transmission processes in the first data re-transmission mode of the data transmission system 10 shown in FIG. 1, and FIG. 13 is a timing diagram illustrating transmission of the valid signal V and data D0 and D1 in the first data re-transmission mode of the data transmission system 10 shown in FIG. 1. In FIGS. 9 to 12, the same reference numerals as used in FIG. 1 denote the same elements. First, referring to the FIG. 9, in the event that an error exists in the transmission data and the re-transmission request signal Z having a logic "high(1)" level is transmitted from the data receiver 200 to the data transmitter 100 as described with reference to FIG. 7, the first FSM controller 110 of the data transmitter 100 may output the data transmission mode control signal TM having a logic level combination of "10" corresponding to the first data re-transmission mode to the data transmission processor 120. The data transmission logic circuit 124 of the data transmission processor 120 may perform the data transmission operation in the first data re-transmission mode according to the logic level combination "10" of the data transmission mode control signal TM.

Because the logic level combination "10" of the data transmission mode control signal TM means the first data re-transmission mode, the data transmission logic circuit 124 may divide the 'N'-bit transmission data, for example, 8-bit transmission data DATA[0:7] into first divided transmission data DATA[0:3] having 4 bits and second divided transmission data DATA[4:7] having 4 bits. The first 4-bit divided transmission data DATA[0:3] and first 4-bit ground data having a ground voltage (i.e., a logic "low(0)" level) may be transmitted through the respective first to eighth transmission lines 311~318. In such a case, in order to suppress the crosstalk between the transmission lines 311~318, the first 4-bit divided transmission data DATA[0:3] may be transmitted through the respective odd-numbered transmission lines (i.e., the first, third, fifth and seventh transmission lines 311, 313, 315 and 317) among the first to eighth transmission lines 311~318 and the first 4-bit ground data may be transmitted through the respective even-numbered transmission lines (i.e., the second, fourth, sixth and eighth transmission lines 312, 314, 316 and 318) among the first to eighth transmission lines 311~318. As a result, the first, third, fifth and seventh transmission lines 311, 313, 315 and 317 through which the first 4-bit divided transmission data DATA[0:3] are respectively transmitted and the second, fourth, sixth and eighth transmission lines 312, 314, 316 and 318 through which the first 4-bit ground data are respectively transmitted may be alternately disposed to suppress the crosstalk between the first 4-bit divided transmission data DATA[0:3].

Specifically, in the present embodiment, the first bit datum DATA[0] of the first 4-bit divided transmission data DATA[0:3] may be transmitted through the first data transmission line 311, the first bit datum of the first 4-bit ground data may be transmitted through the second data transmission line 312, the second bit datum DATA[1] of the first 4-bit divided transmission data DATA[0:3] may be transmitted through the third data transmission line 313, the second bit datum of the first 4-bit ground data may be transmitted through the fourth data transmission line 314, the third bit datum DATA[2] of the first 4-bit divided transmission data DATA[0:3] may be transmitted through the fifth data transmission line 315, the third bit datum of the first 4-bit ground data may be transmitted through the sixth data transmission line 316, the fourth bit datum DATA[3] of the first 4-bit divided transmission data DATA[0:3] may be transmitted through the seventh data transmission line 317, and the fourth bit datum of the first 4-bit ground data may be transmitted through the eighth data transmission line 318.

Figure 10:
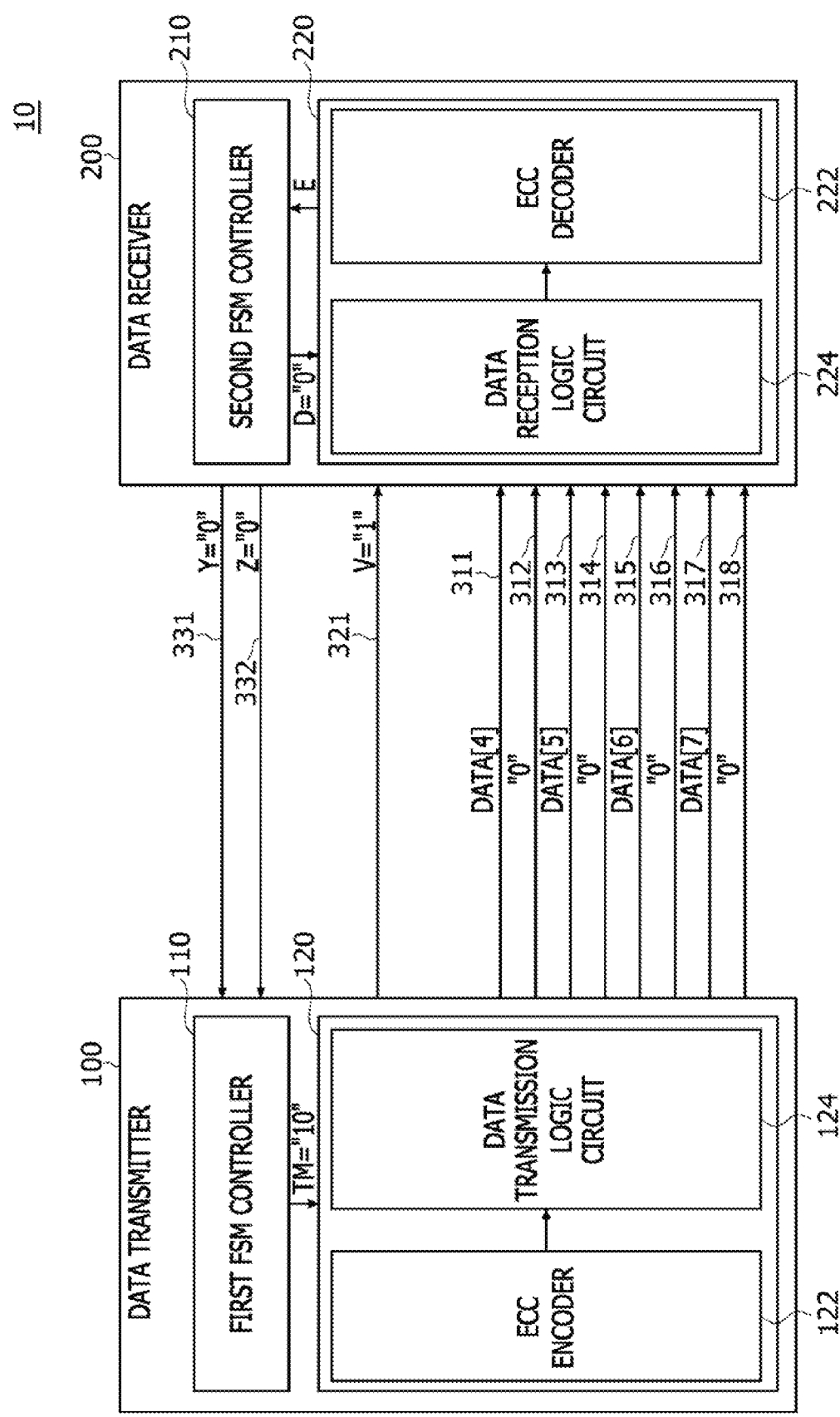

Referring to FIG. 10, after the first 4-bit divided transmission data DATA[0:3] are transmitted together with the first 4-bit ground data, the second 4-bit divided transmission data DATA[4:7] and the first 4-bit ground data having a ground voltage (i.e., a logic "low(0)" level) may be transmitted through the respective first to eighth transmission lines 311~318. Even in such a case, in order to suppress the crosstalk between the transmission lines 311~318, the second 4-bit divided transmission data DATA[4:7] may be transmitted through the respective odd-numbered transmission lines (i.e., the first, third, fifth and seventh transmission lines 311, 313, 315 and 317) among the first to eighth transmission lines 311~318 and the first 4-bit ground data may be transmitted through the respective even-numbered transmission lines (i.e., the second, fourth, sixth and eighth transmission lines 312, 314, 316 and 318) among the first to eighth transmission lines 311~318. As a result, the first, third, fifth and seventh transmission lines 311, 313, 315 and 317 through which the second 4-bit divided transmission data DATA[4:7] are respectively transmitted and the second, fourth, sixth and eighth transmission lines 312, 314, 316 and 318 through which the first 4-bit ground data are respectively transmitted may be alternately disposed to suppress the crosstalk between the second 4-bit divided transmission data DATA[4:7].

Specifically, in the present embodiment, the first bit datum DATA[4] of the second 4-bit divided transmission data DATA[4:7] may be transmitted through the first data transmission line 311, the first bit datum of the first 4-bit ground data may be transmitted through the second data transmission line 312, the second bit datum DATA[5] of the second 4-bit divided transmission data DATA[4:7] may be transmitted through the third data transmission line 313, the second bit datum of the first 4-bit ground data may be transmitted through the fourth data transmission line 314, the third bit datum DATA[6] of the second 4-bit divided transmission data DATA[4:7] may be transmitted through the fifth data transmission line 315, the third bit datum of the first 4-bit ground data may be transmitted through the sixth data transmission line 316, the fourth bit datum DATA[7] of the second 4-bit divided transmission data DATA[4:7] may be transmitted through the seventh data transmission line 317, and the fourth bit datum of the first 4-bit ground data may be transmitted through the eighth data transmission line 318.

As illustrated in FIG. 13, an operation of transmitting data DATA including the first and second 4-bit divided transmission data D0 and D1 in the first data re-transmission mode may be performed during two cycles of the data transmission clock signal CLK. During a first cycle of the data transmission clock signal CLK, the first 4-bit divided transmission data D0 may be transmitted together with the first 4-bit ground data. During a second cycle of the data transmission clock signal CLK, the second 4-bit divided transmission data D1 may be transmitted together with the first 4-bit ground data. Because the first ground data having a ground voltage are transmitted through the even-numbered transmission lines (i.e., the second, fourth, sixth and eighth transmission lines 312, 314, 316 and 318) adjacent to the respective odd-numbered transmission lines (i.e., the first, third, fifth and seventh transmission lines 311, 313, 315 and 317) through which the first 4-bit divided transmission data D0 are transmitted, crosstalk between the transmission lines may be suppressed while the first 4-bit divided transmission data D0 are transmitted through the odd-numbered transmission lines. Similarly, because the first ground data having a ground voltage are transmitted through the even-numbered transmission lines (i.e., the second, fourth, sixth and eighth transmission lines 312, 314, 316 and 318) adjacent to the respective odd-numbered transmission lines (i.e., the first, third, fifth and seventh transmission lines 311, 313, 315 and 317) through which the second 4-bit divided transmission data D1 are transmitted, crosstalk between the transmission lines may also be suppressed even while the second 4-bit divided transmission data D1 are transmitted through the odd-numbered transmission lines. That is, the data error occurrence due to the crosstalk may be more effectively suppressed in the first data re-transmission mode than in the normal transmission mode.

While the first and second 4-bit divided transmission data D0 and D1 are transmitted, the valid signal V may maintain a logic "high(1)" level. That is, the valid signal V may have a logic "low(0)" level before the first and second 4-bit divided transmission data D0 and D1 are transmitted, and a level of the valid signal V may be changed from a logic "low(0)" level to a logic "high(1)" level at a point in time when the transmission of the first 4-bit divided transmission data D0 starts. If the transmission of the second 4-bit divided transmission data D1 terminates, a level of the valid signal V may return to a logic "low(0)" level again. Thus, the data receiver 200 may be able to detect a start point in transmission of the first 4-bit divided transmission data D0 and an end point in transmission of the second 4-bit divided transmission data D1 from the level transition of the valid signal V. While the valid signal V maintains a logic "high(1)" level, the second FSM controller 210 of the data receiver 200 may output the ECC decoding control signal D having a logic "low(0)" level to the data reception processor 220. Thus, the data reception processor 220 may perform only an operation of receiving the first and second divided transmission data D0 and D1 but not perform the ECC decoding operation. Because the ECC decoding operation is not performed, the error signal E may not be inputted to the second FSM controller 210. In addition, both of the reception end signal Y and the re-transmission request signal Z outputted from the second FSM controller 210 may maintain a logic "low (0)" level.

Referring to FIGS. 11 and 12, if the transmission of the first and second 4-bit divided transmission data DATA[0:3] and DATA[4:7] terminates in the first data re-transmission mode, a level of the valid signal V may be changed from a logic "high(1)" level to a logic "low(0)". If a level of the valid signal V is changed from a logic "high(1)" level to a logic "low(0)", the second FSM controller 210 of the data receiver 200 may output the ECC decoding control signal D having a logic "high(1)" level to the data reception processor 220. The data reception logic circuit 224 of the data reception processor 220 may merge the first and second 4-bit divided transmission data DATA[0:3] and DATA[4:7] to restore the transmission data and may output the restored transmission data to the ECC decoder 222. The ECC decoder 222 of the data reception processor 220 may receive the restored transmission data from the data reception logic circuit 224 and may perform the ECC decoding operation of the restored transmission data to discriminate whether the restored transmission data are erroneous data. If no error exists in the restored transmission data, the ECC decoder 222 may output the error signal E having a logic "low(0)" level to the second FSM controller 210, as illustrated in FIG. 11. When the error signal E having a logic "low(0)" level is inputted to the second FSM controller 210, the second FSM controller 210 may transmit the reception end signal Y having a logic "high(1)" level and the re-transmission request signal Z having a logic "low(0)" level to the data transmitter 100. In contrast, if the restored transmission data are erroneous data, the ECC decoder 222 may output the error signal E having a logic "high(1)" level to the second FSM controller 210, as illustrated in FIG. 12. When the error signal E having a logic "high(1)" level is inputted to the second FSM controller 210, the second FSM controller 210 may transmit the reception end signal Y having a logic "low(0)" level and the re-transmission request signal Z having a logic "high(1)" level to the data transmitter 100.

Figure 17:
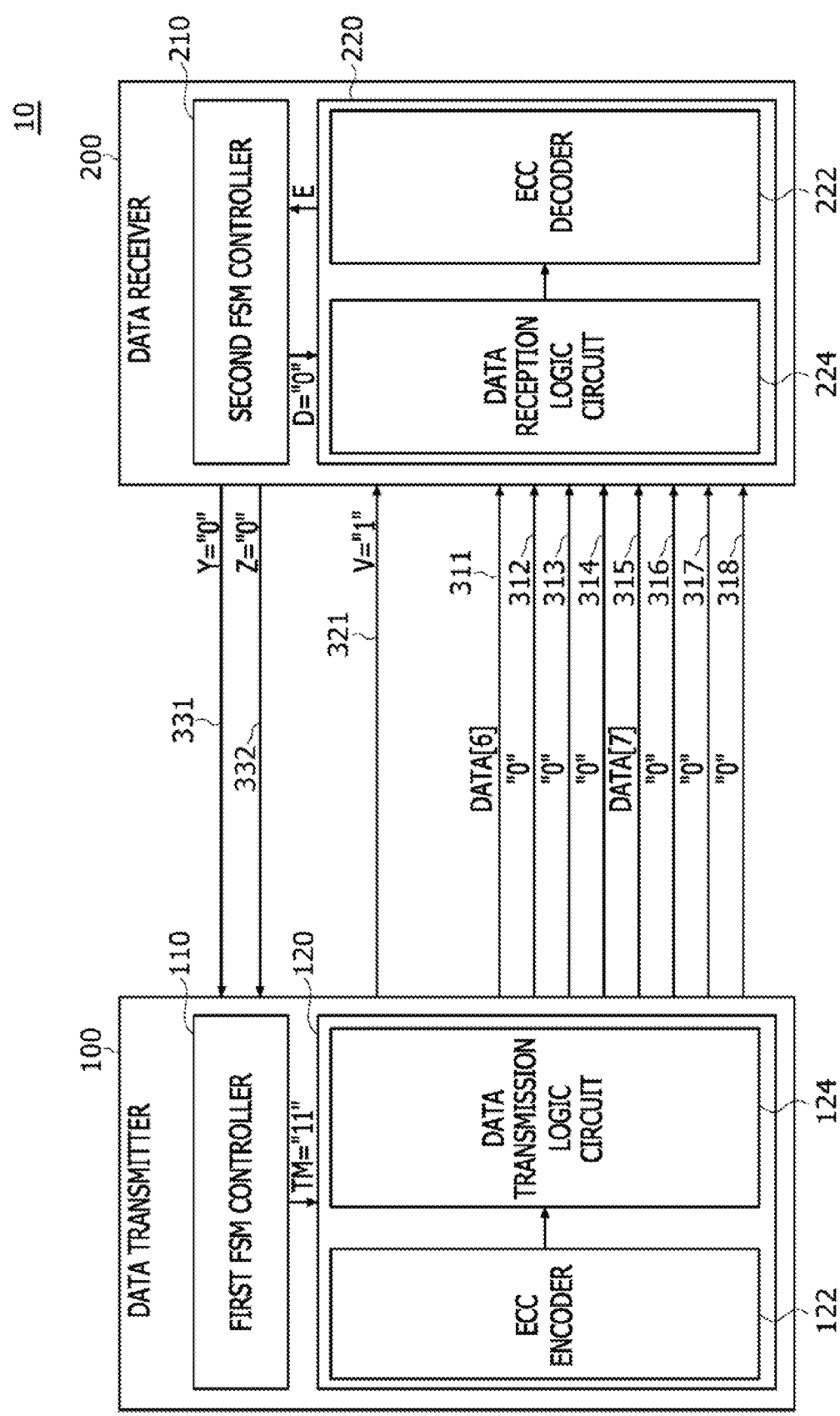
Figure 18:
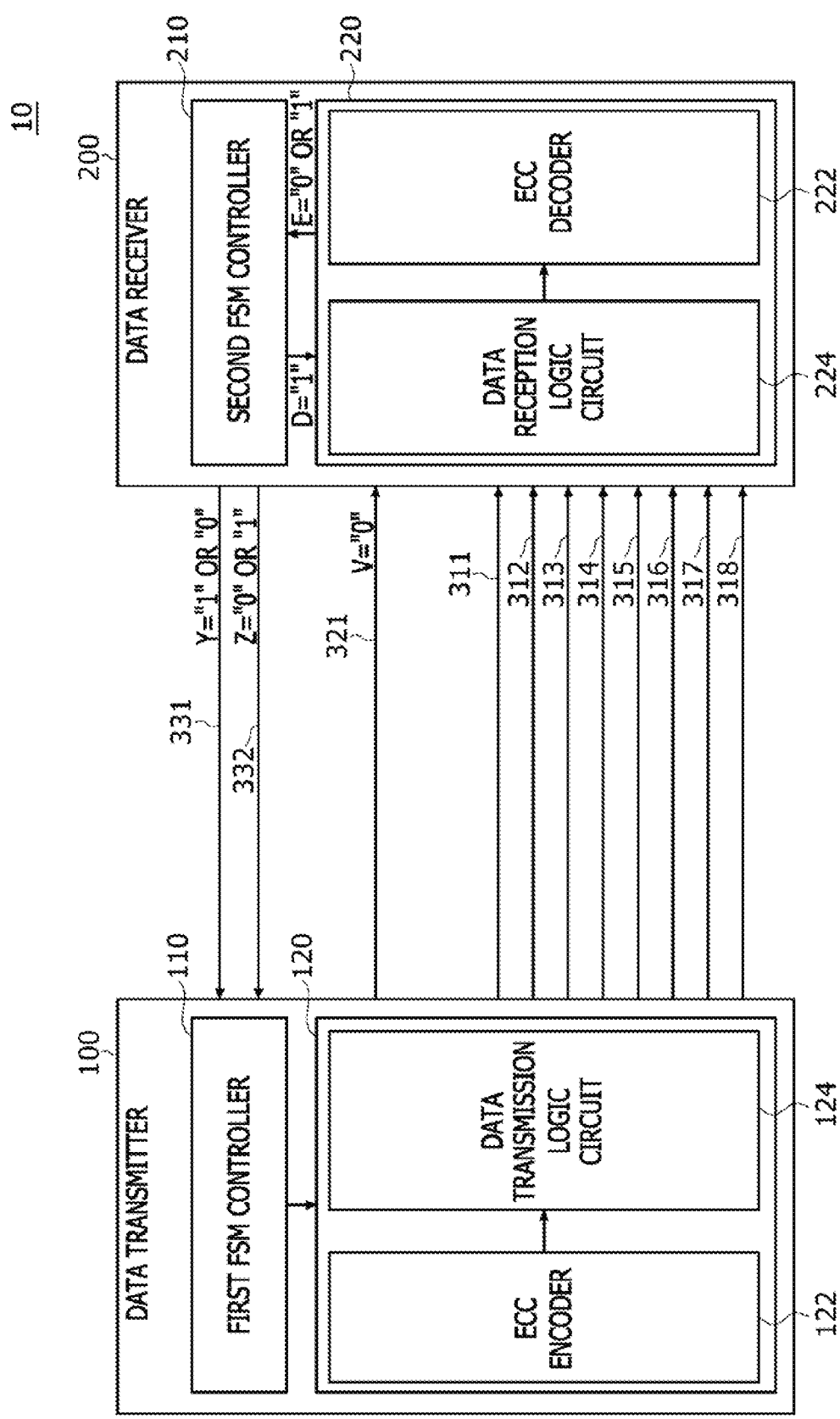
Figure 19:
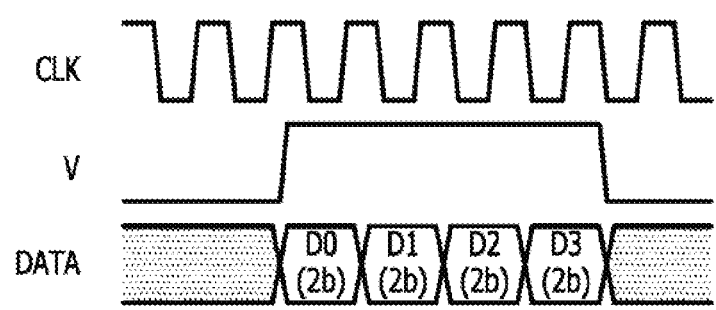
FIG. 19 is a timing diagram illustrating transmission of a valid signal and transmission data in a second data re-transmission mode of a data transmission system according to an embodiment of the present disclosure.

FIGS. 14 to 18 are block diagrams illustrating data transmission processes in the second data re-transmission mode of the data transmission system 10 shown in FIG. 1, and FIG. 19 is a timing diagram illustrating transmission of the valid signal V and data D0, D1, D2 and D3 in the first data re-transmission mode of the data transmission system 10 shown in FIG. 1. In FIGS. 14 to 18, the same reference numerals as used in FIG. 1 denote the same elements. First, referring to the FIG. 14, in the event that an error exists in the transmission data and the re-transmission request signal Z having a logic "high(1)" level is transmitted from the data receiver 200 to the data transmitter 100 as described with reference to FIG. 12, the first FSM controller 110 of the data transmitter 100 may output the data transmission mode control signal TM having a logic level combination of "11" corresponding to the second data re-transmission mode to the data transmission processor 120. The data transmission logic circuit 124 of the data transmission processor 120 may perform the data transmission operation in the second data re-transmission mode according to the logic level combination "11" of the data transmission mode control signal TM.

Figure 14:
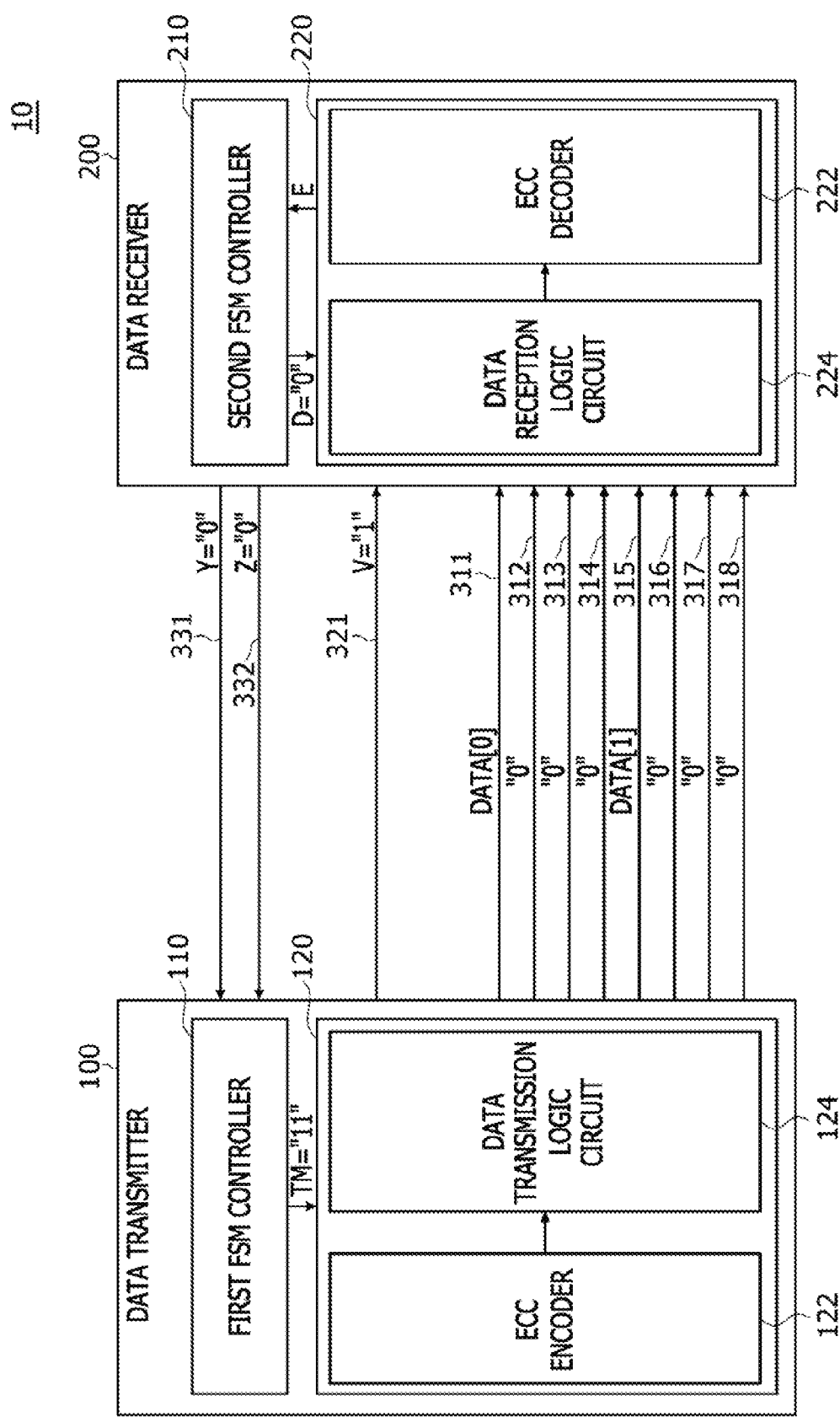
FIGS. 14 to 18 are block diagrams illustrating data transmission processes in a second data re-transmission mode of a data transmission system according to an embodiment of the present disclosure.

Referring to FIG. 14, because the logic level combination "11" of the data transmission mode control signal TM means the second data re-transmission mode, the data transmission logic circuit 124 may divide the 'N'-bit transmission data, for example, 8-bit transmission data DATA[0:7] into first additionally divided transmission data DATA[0:1] having 2 bits, second additionally divided transmission data DATA [2:3] having 2 bits, third additionally divided transmission data DATA[4:5] having 2 bits, and fourth additionally divided transmission data DATA[6:7] having 2 bits. The first 2-bit additionally divided transmission data DATA[0:1] and second 6-bit ground data having a ground voltage (i.e., a logic "low(0)" level) may be transmitted through the respective first to eighth transmission lines 311~318. In such a case, in order to more efficiently suppress the crosstalk between the transmission lines 311~318, the first to eighth transmission lines 311~318 may be divided into two groups, each of which includes four transmission lines. A first group of the transmission lines may include the first to fourth transmission lines 311~314, and a second group of the transmission lines may include the fifth to eighth transmission lines 315~318. In such a case, the first 2-bit additionally divided transmission data DATA[0:1] may be transmitted through a first line 311 of the first group of the transmission lines 311~314 and a first line 315 of the second group of the transmission lines 315~318, respectively. While the first 2-bit additionally divided transmission data DATA[0:1] are transmitted, the second 6-bit ground data having a ground voltage (i.e., a logic "low(0)" level) may be transmitted through the respective remaining transmission lines 312~314 and 316~318 among the data transmission lines 311~318.

As described above, the first data transmission line 311 transmitting the first bit datum DATA[0] of the first 2-bit additionally divided transmission data DATA[0:1] and the fifth data transmission line 315 transmitting the second bit datum DATA[1] of the first 2-bit additionally divided transmission data DATA[0:1] may be spaced apart from each other by the second, third and fourth data transmission lines 312, 313 and 314 through which the second ground data having a ground voltage are transmitted. Thus, the data error occurrence due to the crosstalk may be more effectively suppressed in the second data re-transmission mode than in the first data re-transmission mode.

Figure 15:
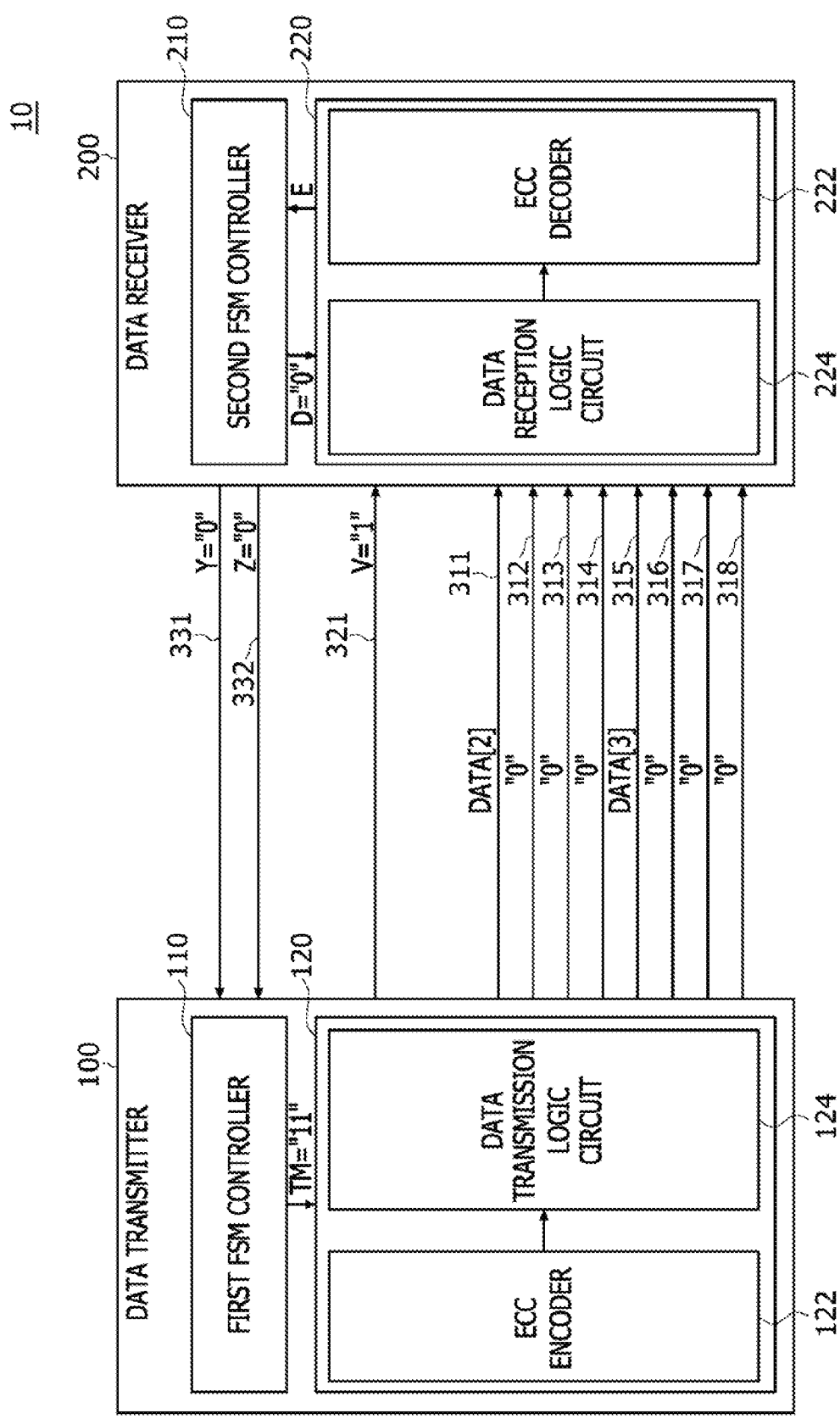

Referring to FIG. 15, after the first 2-bit additionally divided transmission data DATA[0:1] are transmitted together with the second 6-bit ground data, the second 2-bit additionally divided transmission data DATA[2:3] and the second 6-bit ground data having a ground voltage (i.e., a logic "low(0)" level) may be transmitted through the respective first to eighth data transmission lines 311~318. Even in such a case, in order to suppress the crosstalk between the transmission lines 311~318, the second 2-bit additionally divided transmission data DATA[2:3] may be transmitted through the first line 311 of the first group of the transmission lines 311~314 and the first line 315 of the second group of the transmission lines 315~318, respectively. While the second 2-bit additionally divided transmission data DATA[2:3] are transmitted, the second 6-bit ground data having a ground voltage (i.e., a logic "low(0)" level) may also be transmitted through the respective remaining transmission lines 312~314 and 316~318 among the data transmission lines 311~318.

Figure 16:
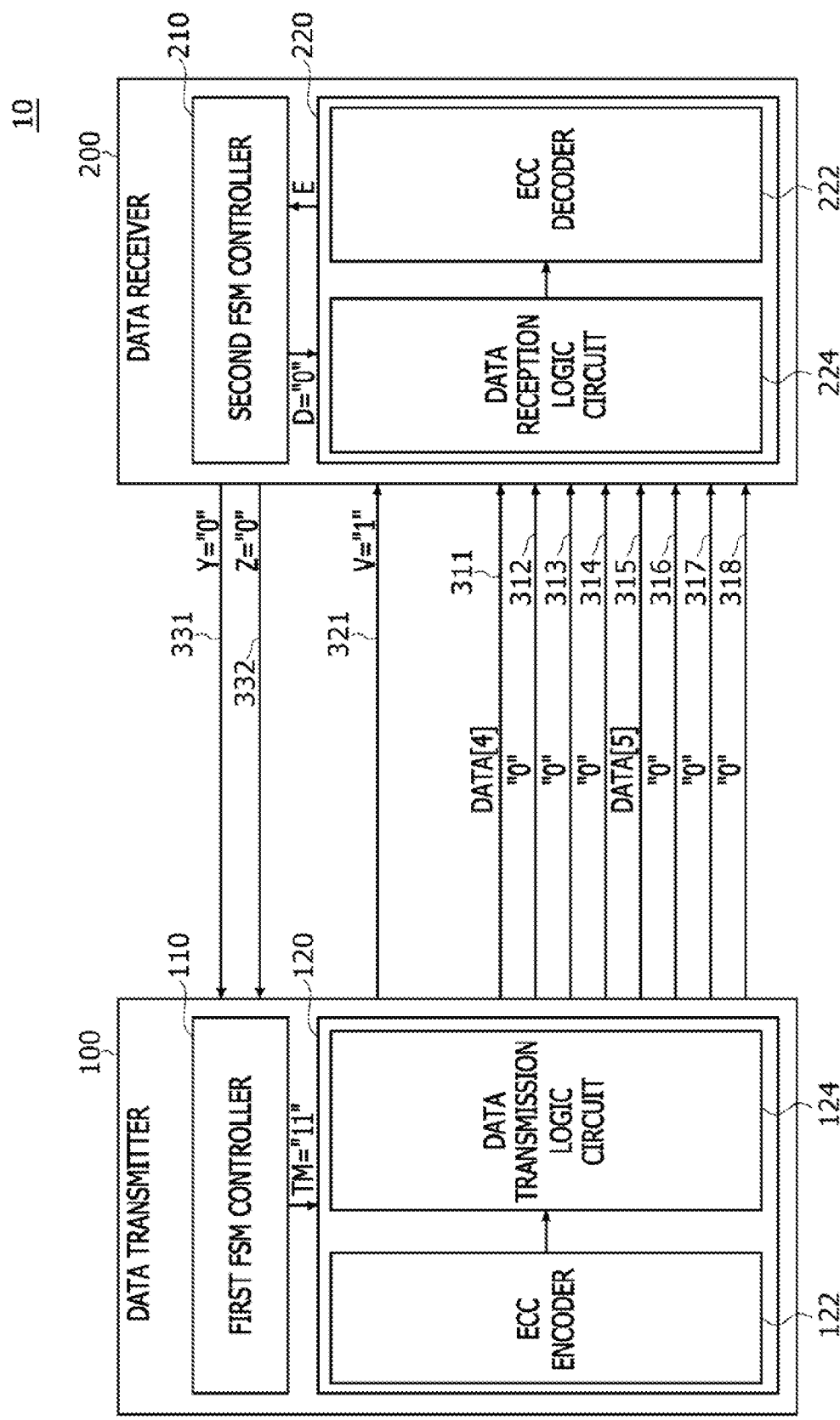

Referring to FIG. 16, after the second 2-bit additionally divided transmission data DATA[2:3] are transmitted together with the second 6-bit ground data, the third 2-bit additionally divided transmission data DATA[4:5] and the second 6-bit ground data having a ground voltage (i.e., a logic "low(0)" level) may be transmitted through the respective first to eighth data transmission lines 311~318. Even in such a case, in order to suppress the crosstalk between the transmission lines 311~318, the third 2-bit additionally divided transmission data DATA[4:5] may be transmitted through the first line 311 of the first group of the transmission lines 311~314 and the first line 315 of the second group of the transmission lines 315~318, respectively. While the third 2-bit additionally divided transmission data DATA[4:5] are transmitted, the second 6-bit ground data having a ground voltage (i.e., a logic "low(0)" level) may also be transmitted through the respective remaining transmission lines 312~314 and 316~318 among the data transmission lines 311~318.

Referring to FIG. 17, after the third 2-bit additionally divided transmission data DATA[4:5] are transmitted together with the second 6-bit ground data, the fourth 2-bit additionally divided transmission data DATA[6:7] and the second 6-bit ground data having a ground voltage (i.e., a logic "low(0)" level) may be transmitted through the respective first to eighth data transmission lines 311~318. Even in such a case, in order to suppress the crosstalk between the transmission lines 311~318, the fourth 2-bit additionally divided transmission data DATA[6:7] may be transmitted through the first line 311 of the first group of the transmission lines 311~314 and the first line 315 of the second group of the transmission lines 315~318, respectively. While the fourth 2-bit additionally divided transmission data DATA[6:7] are transmitted, the second 6-bit ground data having a ground voltage (i.e., a logic "low(0)" level) may also be transmitted through respective ones of the remaining transmission lines 312~314 and 316~318 among the data transmission lines 311~318.

As illustrated in FIG. 19, an operation of transmitting data DATA including the first to fourth 2-bit additionally divided transmission data D0, D1, D2 and D3 in the second data re-transmission mode may be performed during four cycles of the data transmission clock signal CLK. During a first cycle of the data transmission clock signal CLK, the first 2-bit additionally divided transmission data D0 may be transmitted together with the second 6-bit ground data. During a second cycle of the data transmission clock signal CLK, the second 2-bit additionally divided transmission data D1 may be transmitted together with the second 6-bit ground data. During a third cycle of the data transmission clock signal CLK, the third 2-bit additionally divided transmission data D2 may be transmitted together with the second 6-bit ground data. During a fourth cycle of the data transmission clock signal CLK, the fourth 2-bit additionally divided transmission data D3 may be transmitted together with the second 6-bit ground data. While the first to fourth 2-bit additionally divided transmission data D0, D1, D2 and D3 are transmitted, the valid signal V may maintain a logic "high(1)" level. That is, the valid signal V may have a logic "low(0)" level before the first 2-bit additionally divided transmission data D0 are transmitted, and a level of the valid signal V may be changed from a logic "low(0)" level to a logic "high(1)" level at a point in time when the transmission of the first 2-bit additionally divided transmission data D0 starts. If the transmission of the fourth 2-bit additionally divided transmission data D3 terminates, a level of the valid signal V may return to a logic "low(0)" level again. Thus, the data receiver 200 may be able to detect a start point and an end point in transmission of the first to fourth 2-bit additionally divided transmission data D0~D3 from the level transition of the valid signal V.

While the valid signal V maintains a logic "high(1)" level, the second FSM controller 210 of the data receiver 200 may output the ECC decoding control signal D having a logic "low(0)" level to the data reception processor 220. Thus, the data reception processor 220 may perform only an operation of receiving the first to fourth additionally divided transmission data D0~D3 but not perform the ECC decoding operation. Because the ECC decoding operation is not performed, the error signal E may not be inputted to the second FSM controller 210. In addition, both of the reception end signal Y and the re-transmission request signal Z outputted from the second FSM controller 210 may maintain a logic "low (0)" level.

Referring to FIG. 18, if the transmission of the first to fourth 2-bit additionally divided transmission data DATA[0:1], DATA[2:3], DATA[4:5] and DATA[6:7] terminates in the second data re-transmission mode, a level of the valid signal V may be changed from a logic "high(1)" level to a logic "low(0)". If a level of the valid signal V is changed from a logic "high(1)" level to a logic "low(0)", the second FSM controller 210 of the data receiver 200 may output the ECC decoding control signal D having a logic "high(1)" level to the data reception processor 220. The data reception logic circuit 224 of the data reception processor 220 may merge the first to fourth 2-bit additionally divided transmission data DATA[0:1], DATA[2:3], DATA[4:5] and DATA[6:7] to restore the transmission data and may output the restored transmission data to the ECC decoder 222. The ECC decoder 222 of the data reception processor 220 may receive the restored transmission data from the data reception logic circuit 224 and may perform the ECC decoding operation of the restored transmission data to discriminate whether the restored transmission data are erroneous data. If no error exists in the restored transmission data, the ECC decoder 222 may output the error signal E having a logic "low(0)" level to the second FSM controller 210. When the error signal E having a logic "low(0)" level is inputted to the second FSM controller 210, the second FSM controller 210 may transmit the reception end signal Y having a logic "high(1)" level and the re-transmission request signal Z having a logic "low(0)" level to the data transmitter 100. In contrast, if the restored transmission data are erroneous data, the ECC decoder 222 may output the error signal E having a logic "high(1)" level to the second FSM controller 210. When the error signal E having a logic "high(1)" level is inputted to the second FSM controller 210, the second FSM controller 210 may transmit the reception end signal Y having a logic "low(0)" level and the re-transmission request signal Z having a logic "high(1)" level to the data transmitter 100.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A data transmission system comprising:
    a data transmitter configured to output 'N'-bit transmission data, wherein 'N' denotes a natural number which is equal to or greater than two; and
    a data receiver configured to receive the 'N'-bit transmission data through 'N'-number of data transmission lines,
    wherein the data receiver is configured to transmit a re-transmission request signal to the data transmitter when the 'N'-bit transmission data inputted to the data receiver are erroneous data,
    wherein the data transmitter is configured to divide the 'N'-bit transmission data in response to the re-transmission request signal and configured to operate in a first data re-transmission mode so that the divided transmission data are resent, together with first ground data, to the data receiver, and
    wherein the first ground data have a binary bit value of "0".

2. The data transmission system of claim 1, wherein the first data re-transmission mode is executed by dividing the 'N'-bit transmission data into first 'N/2'-bit divided transmission data and second 'N/2'-bit divided transmission data and by resending the first and second 'N/2'-bit divided transmission data together with the first ground data.

3. The data transmission system of claim 2,
    wherein the 'N'-number of data transmission lines comprise 'N/2'-number of odd-numbered transmission lines and 'N/2'-number of even-numbered transmission lines; and
    wherein in the first data re-transmission mode, the first and second 'N/2'-bit divided transmission data are transmitted through the 'N/2'-number of odd-numbered transmission lines and the first ground data are transmitted through the 'N/2'-number of even-numbered transmission lines.

4. The data transmission system of claim 2, wherein in the first data re-transmission mode, the first 'N/2'-bit divided transmission data and the first ground data are transmitted during a first cycle of a data transmission clock signal, and the second 'N/2'-bit divided transmission data and the first ground data are transmitted during a second cycle of the data transmission clock signal.

5. The data transmission system of claim 1,
    wherein the data receiver is configured to transmit a second re-transmission request signal to the data transmitter when an error exists in the transmission data which are transmitted in the first data re-transmission mode; and
    wherein the data transmitter is configured to additionally divide the transmission data in response to the second re-transmission request signal and configured to operate in a second data re-transmission mode to resend the additionally divided transmission data together with second ground data.

6. The data transmission system of claim 5, wherein the second data re-transmission mode is executed by dividing the 'N'-bit transmission data into first to fourth 'N/4'-bit additionally divided transmission data and by resending the first to fourth 'N/4'-bit additionally divided transmission data together with the second ground data.

7. The data transmission system of claim 6,
    wherein the 'N'-number of data transmission lines comprise a first group of 'N/2'-number of transmission lines adjacent to each other and a second group of 'N/2'-number of transmission lines adjacent to each other; and
    wherein in the second data re-transmission mode, each of the first to fourth 'N/4'-bit additionally divided transmission data are transmitted through a first line of the first group of 'N/2'-number of transmission lines and a first line of the second group of 'N/2'-number of transmission lines, respectively, and the second ground data are transmitted through the remaining lines of the first and second groups of 'N/2'-number of transmission lines.

8. The data transmission system of claim 6, wherein, in the second data re-transmission mode:
    the first 'N/4'-bit additionally divided transmission data and the second ground data are transmitted during a first cycle of a data transmission clock signal;
    the second 'N/4'-bit additionally divided transmission data and the second ground data are transmitted during a second cycle of the data transmission clock signal;
    the third 'N/4'-bit additionally divided transmission data and the second ground data are transmitted during a third cycle of the data transmission clock signal; and
    the fourth 'N/4'-bit additionally divided transmission data and the second ground data are transmitted during a fourth cycle of the data transmission clock signal.

9. The data transmission system of claim 5, wherein the second ground data have a binary bit value of "0".

10. The data transmission system of claim 1, wherein the data transmitter comprises:
    a first finite state machine (FSM) controller configured to control a data transmission operation; and
    a data transmission processor configured to perform the data transmission operation in a normal transmission mode, the first data re-transmission mode, or a second data re-transmission mode according to a control signal of the first FSM controller.

11. The data transmission system of claim 10, wherein the data transmission processor comprises:
an error correction code (ECC) encoder configured to perform an ECC encoding operation of original data to generate the transmission data comprising parity data; and
a data transmission logic circuit configured to transmit the transmission data outputted from the ECC encoder in a transmission mode which is designated by a data transmission mode control signal outputted from the first FSM controller.

12. The data transmission system of claim 11,
wherein the first FSM controller is configured to generate a control signal for performing operations of a plurality of states in the data transmitter; and
wherein the plurality of states comprise:
a first state corresponding to a data transmission standby mode;
a second state corresponding to the normal transmission mode;
a third state corresponding to the first data re-transmission mode; and
a fourth state corresponding to the second data re-transmission mode.

13. The data transmission system of claim 12,
wherein the first FSM controller changes a state of the data transmitter from the first state to the second state in response to an input control signal to generate the data transmission mode control signal corresponding to the normal transmission mode;
wherein the first FSM controller changes the state of the data transmitter from the second state to the third state in response to a re-transmission request signal outputted from the data receiver to generate the data transmission mode control signal corresponding to the first data re-transmission mode;
wherein the first FSM controller changes the state of the data transmitter from the third state to the fourth state in response to a second re-transmission request signal outputted from the data receiver to generate the data transmission mode control signal corresponding to the second data re-transmission mode; and
wherein the first FSM controller changes the state of the data transmitter from any one of the second, third, and fourth states to the first state in response to a reception end signal outputted from the data receiver.

14. The data transmission system of claim 13,
wherein the data transmission logic circuit receives the data transmission mode control signal corresponding to the normal transmission mode to transmit the 'N'-bit transmission data through the 'N'-number of data transmission lines;
wherein the data transmission logic circuit receives the data transmission mode control signal corresponding to the first data re-transmission mode to divide the 'N'-bit transmission data into first 'N/2'-bit divided transmission data and second 'N/2'-bit divided transmission data and to resend the first and second 'N/2'-bit divided transmission data together with the first ground data; and
wherein the data transmission logic circuit receives the data transmission mode control signal corresponding to the second data re-transmission mode to divide the 'N'-bit transmission data into first to fourth 'N/4'-bit divided transmission data and to resend the first to fourth 'N/4'-bit divided transmission data together with second ground data.

15. The data transmission system of claim 1, further comprising a valid signal transmission line between the data transmitter and the data receiver,
wherein the data transmitter transmits a valid signal having a certain level to the data receiver through the valid signal transmission line while the transmission data are transmitted.

16. The data transmission system of claim 15, wherein the data receiver comprises:
a second FSM controller configured to control a data reception operation of the transmission data and a data re-transmission request operation of the transmission data; and
a data reception processor configured to perform the data reception operation and an error check operation of the transmission data, which are outputted from the data transmitter, under the control of the second FSM controller.

17. The data transmission system of claim 16, wherein the data reception processor comprises:
a data reception logic circuit configured to receive the transmission data outputted from the data transmitter and configured to merge the divided transmission data to restore the transmission data; and
an ECC decoder configured to perform an ECC decoding operation of the restored transmission data outputted from the data reception logic circuit to output an error signal indicating whether the restored transmission data are erroneous data.

18. The data transmission system of claim 17,
wherein the second FSM controller is configured to generate a control signal for performing operations of a plurality of states in the data receiver; and
wherein the plurality of states comprise:
a first state corresponding to a data reception standby state;
a second state corresponding to a data reception state;
a third state corresponding to an ECC decoding state;
a fourth state corresponding to a reception end state; and
a fifth state corresponding to a re-transmission request state.

19. The data transmission system of claim 18,
wherein the second FSM controller changes a state of the data receiver from the first state to the second state to generate a control signal for receiving the transmission data when a level of the valid signal changes from a first level to a second level;
wherein the second FSM controller changes a state of the data receiver from the second state to the third state to generate the control signal for performing the ECC decoding operation when a level of the valid signal changes from the second level into the first level; and
wherein the second FSM controller changes a state of the data receiver from the third state to the fourth or fifth state to generate a reception end signal and a re-transmission request signal, in response to the error signal.

20. A data transmission method comprising:
transmitting in parallel 'N'-bit transmission data from a data transmitter to a data receiver through 'N'-number of data transmission lines, wherein 'N' denotes a natural number which is equal to or greater than two;

transmitting a re-transmission request signal to the data transmitter from the data receiver when the 'N'-bit transmission data inputted to the data receiver are erroneous data; and dividing the 'N'-bit transmission data in the data transmitter in response to the re-transmission request signal to perform a first data re-transmission operation for resending the divided transmission data together with first ground data to the data receiver, wherein the first ground data have a binary bit value of "0".

21. The data transmission method of claim 20, wherein the first data re-transmission operation is executed by dividing the 'N'-bit transmission data into first 'N/2'-bit divided transmission data and second 'N/2'-bit divided transmission data and by resending the first and second 'N/2'-bit divided transmission data together with the first ground data.

22. The data transmission method of claim 21,
wherein the 'N'-number of data transmission lines comprise 'N/2'-number of odd-numbered transmission lines and 'N/2'-number of even-numbered transmission lines; and
wherein during the first data re-transmission operation, the first and second 'N/2'-bit divided transmission data are transmitted through the 'N/2'-number of odd-numbered transmission lines and the first ground data are transmitted through the 'N/2'-number of even-numbered transmission lines.

23. The data transmission method of claim 21, wherein while the first data re-transmission operation is performed, the first 'N/2'-bit divided transmission data and the first ground data are transmitted during a first cycle of a data transmission clock signal, and the second 'N/2'-bit divided transmission data and the first ground data are transmitted during a second cycle of the data transmission clock signal.

24. The data transmission method of claim 23, further comprising transmitting a valid signal having a certain level to the data receiver while the first data re-transmission operation is performed.

25. The data transmission method of claim 20, further comprising:
transmitting a second re-transmission request signal to the data transmitter when an error exists in the divided transmission data; and
additionally dividing the transmission data in the data transmitter in response to the second re-transmission request signal to perform a second data re-transmission operation for resending the additionally divided transmission data together with second ground data to the data receiver.

26. The data transmission method of claim 25, wherein the second data re-transmission operation is executed by dividing the 'N'-bit transmission data into first to fourth 'N/4'-bit additionally divided transmission data and by resending the first to fourth 'N/4'-bit additionally divided transmission data together with the second ground data.

27. The data transmission method of claim 26,
wherein the 'N'-number of data transmission lines comprise a first group of 'N/2'-number of transmission lines adjacent to each other and a second group of 'N/2'-number of transmission lines adjacent to each other; and
wherein during the second data re-transmission operation, each of the first to fourth 'N/4'-bit additionally divided transmission data are transmitted through a first line of the first group of 'N/2'-number of transmission lines and a first line of the second group of 'N/2'-number of transmission lines, respectively, and the second ground data are transmitted through the remaining lines of the first and second groups of 'N/2'-number of transmission lines.

28. The data transmission method of claim 26, wherein, while the second data re-transmission operation is performed:
the first 'N/4'-bit additionally divided transmission data and the second ground data are transmitted during a first cycle of a data transmission clock signal;
the second 'N/4'-bit additionally divided transmission data and the second ground data are transmitted during a second cycle of the data transmission clock signal;
the third 'N/4'-bit additionally divided transmission data and the second ground data are transmitted during a third cycle of the data transmission clock signal; and
the fourth 'N/4'-bit additionally divided transmission data and the second ground data are transmitted during a fourth cycle of the data transmission clock signal.

29. The data transmission method of claim 28, further comprising transmitting a valid signal having a certain level to the data receiver while the second data re-transmission operation is performed.

30. The data transmission system of claim 25, wherein the second ground data have a binary bit value of "0".

* * * * *